US012387041B2

(12) United States Patent
Imani et al.

(10) Patent No.: US 12,387,041 B2
(45) Date of Patent: Aug. 12, 2025

(54) ADAPTIVE THEME EXTRACTION FROM COMMUNICATION DATA IN A COMMUNICATION CENTER ENVIRONMENT

(71) Applicant: Fulcrum Management Solutions Ltd., Rossland (CA)

(72) Inventors: Farhad Imani, Rossland (CA); Thomas John Procter, Rossland (CA)

(73) Assignee: Fulcrum Management Solutions Ltd., Rossland (CA)

( * ) Notice: Subject to any disclaimer, the term of this patent is extended or adjusted under 35 U.S.C. 154(b) by 0 days.

(21) Appl. No.: 19/000,557

(22) Filed: Dec. 23, 2024

(65) Prior Publication Data
US 2025/0124228 A1   Apr. 17, 2025

Related U.S. Application Data

(63) Continuation-in-part of application No. 18/336,026, filed on Jun. 16, 2023, which is a continuation of
(Continued)

(51) Int. Cl.
*G06F 40/30* (2020.01)
*G06F 40/117* (2020.01)
(Continued)

(52) U.S. Cl.
CPC .......... *G06F 40/284* (2020.01); *G06F 40/117* (2020.01); *G06F 40/242* (2020.01)

(58) Field of Classification Search
CPC .......... G06F 40/20; G06F 40/30; G06F 16/35; G06N 20/00; G06N 3/08
See application file for complete search history.

(56) References Cited

U.S. PATENT DOCUMENTS 11,694,030 B1 *  7/2023  Imani ................ G06F 16/345
                                              704/9
11,921,768 B1 *  3/2024  Ganesh .............. G06N 3/02
(Continued)

OTHER PUBLICATIONS

Kozlowski, Diego, Carolina Pradier, and Pierre Benz. "Generative AI for automatic topic labelling." arXiv preprint arXiv:2408.07003 (Aug. 13, 2024). (Year: 2024).*
(Continued)

*Primary Examiner* — Jialong He
(74) *Attorney, Agent, or Firm* — Marin Patents LLC; Gustavo Marin

(57) ABSTRACT

A system for theming is disclosed. A transformer receives a plurality of sampled thought objects and a prompt from a theming computer. The prompt is designed to provide context data, format requirements, and instructions for theme assignment. The plurality of thought objects comprises text present in data from communication environments and the prompt requests the transformer to assign themes to each thought object. An object-theming transformer with a list of themes determines the probability score for mapping a thought object to a list of themes. When an associated probability score is above a threshold, the thought object is assigned to a known theme. In an embodiment, un-themed thought objects (not mapped to known themes) are provided to a topic identification transformer to generate theme names. The themes assigned and/or generated by the theming transformer and topic identification transformer are displayed on a graphical user interface.

12 Claims, 26 Drawing Sheets

Related U.S. Application Data application No. 17/714,317, filed on Apr. 6, 2022, now Pat. No. 11,694,030.

(51) Int. Cl.
*G06F 40/20* (2020.01)
*G06F 40/242* (2020.01)
*G06F 40/284* (2020.01)
*G06N 20/00* (2019.01)

(56) References Cited

U.S. PATENT DOCUMENTS

2022/0414123 A1* 12/2022 Cakaloglu .............. G06Q 50/01
2023/0056003 A1* 2/2023 Forster ................... G06F 40/44

OTHER PUBLICATIONS

Piao, Guangyuan. "Scholarly text classification with sentence BERT and entity embeddings." Trends and Applications in Knowledge Discovery and Data Mining: PAKDD 2021 Workshops, WSPA, MLMEIN, SDPRA, DARAI, and AI4EPT, Delhi, India, May 11, 2021 Proceedings 25. Springer International Publishing, 2021. (Year: 2021).*

Gao, Wang, et al. "Topic-BERT: Detecting harmful information from social media." Intelligent Decision Technologies 15.3 (2021): 333-342. (Year: 2021).*

Zhou, Yuxiang, et al. "TopicBERT: A topic-enhanced neural language model fine-tuned for sentiment classification." IEEE Transactions on Neural Networks and Learning Systems 34.1 (2021): 380-393. (Year: 2021).*

* cited by examiner

ADAPTIVE THEME EXTRACTION FROM COMMUNICATION DATA IN A COMMUNICATION CENTER ENVIRONMENT

CROSS-REFERENCE TO RELATED APPLICATIONS

This application is a continuation-in-part of U.S. patent application Ser. No. 18/336,026 titled, "SYSTEM AND METHOD FOR AUTOMATIC THEMING OF A PLURALITY OF THOUGHT OBJECTS", which is a continuation of U.S. patent application Ser. No. 17/714,317 titled, "SYSTEM AND METHOD FOR AUTOMATIC THEMING OF A PLURALITY OF THOUGHT OBJECTS", the entire specifications of which are incorporated herein by reference.

BACKGROUND OF THE INVENTION

Field of the Art

The present invention relates to the field of processing qualitative responses from a plurality of user devices, and more particularly to the field of computing and categorizing thought objects into themes based on a plurality of qualitative responses received from a plurality of user devices.

Discussion of the State of the Art

In modern data-driven decision-making processes across various industries, understanding and analyzing user input has become increasingly crucial. Organizations regularly engage in information exchanges where they solicit feedback from users through diverse channels such as surveys, focus groups, social media platforms, information exchanges, and customer support interactions. These feedback mechanisms are particularly vital in fields such as market research, where companies conduct extensive surveys to gauge consumer preferences and market trends; customer experience management, where businesses use feedback forms and post-interaction surveys to assess satisfaction levels; product development, where user testing feedback and feature request surveys guide innovation; and the like. Additionally, sectors like education utilize course evaluations, healthcare employs patient satisfaction surveys, and agencies conduct public opinion polls and information exchanges. The proliferation of these feedback-gathering methods has led to an exponential increase in the volume of user-generated qualitative data, necessitating advanced tools for efficient analysis and insight extraction.

Typically, when gathering input from a plurality of user participant devices, two different types of participant responses are elicited: quantitative responses and qualitative responses. Quantitative responses are close ended, such as multiple choice, numeric style, or yes/no responses. These are easily categorized and analyzed but often lack depth and nuance. In contrast, qualitative responses are open-ended, comment-style responses where participants have the freedom to textualize associated ideas without being constrained by pre-determined answers. Qualitative responses can provide more detailed information on participant interests, consisting of areas of alignment, sentiment, or topics, offering substantial benefits over quantitative responses in terms of insight richness.

However, the handling, evaluating, distributing, and theming of qualitative responses present significant challenges compared to quantitative data. Theming, defined as the application of text labels to thought objects for categorization into specific classes, is particularly crucial in thought object exchange platforms such as text messaging, email, instant messaging, and conference meeting tools. The process of theming allows for the organization and analysis of large volumes of unstructured text data, enabling businesses and researchers to extract meaningful insights from user feedback, customer reviews, and other forms of qualitative input.

Current systems in the art face several limitations in providing effective theming solutions. They often struggle to deliver exchange-specific detailed theming of thought objects based on the qualitative content within a particular exchange. This limitation stems from the diverse nature of exchanges across different domains and the need for themes that are highly specific to each context. For instance, themes relevant in a customer support scenario might differ significantly from those in a product development discussion, even if both involve similar topics at a surface level.

Moreover, applying previously manually themed thought objects to build supervised models extendable to new exchanges presents significant challenges. Manual theming in each exchange is typically done based on the specific requirements of that exchange and may not transfer well to others. Additionally, the size of training data from manual theming is often insufficient to generate a comprehensive model of theming that can be broadly applied.

Conventional supervised Natural Language Processing (NLP) approaches, which require a significant number of training samples, have proven ineffective in addressing this problem. The primary reason for this ineffectiveness lies in the widespread topics covered in exchanges that do not overlap, leading to a limited number of training samples per topic. Even in cases where there may be some overlaps across exchanges, different tenants (users or organizations) are inclined to theme thought objects differently, making general themes provided by current systems unusable in specific thought object exchanges.

The emergence of neural transformers in recent years has shown promise in various natural language understanding tasks. However, their application to the specific challenge of theming thought objects in diverse and context-specific exchanges remains unexplored. Neural transformers, with their ability to understand context and generate human-like text, present a potential solution to the limitations of current theming approaches, but require careful adaptation and implementation to address the unique challenges of thought object theming.

Given these challenges, there is a need in the art for a system and method that can automatically learn from a limited number of thought objects from one or more exchanges, correlating well with that specific exchange in a supervised framework. Furthermore, for thought objects that cannot be themed using this supervised approach, there is a need for a complementary unsupervised framework that can generate themes automatically using data specific to that exchange. Such a system would greatly enhance the ability of businesses and researchers to extract meaningful insights from qualitative data across various domains and applications.

SUMMARY OF THE INVENTION

The present invention relates to systems and methods for automatic theming of thought objects utilizing transformers. In particular, the invention addresses the challenge of efficiently categorizing and theming diverse text data from various communication environments.

The disclosed system comprises one or more processors and a memory storing one or more programs configured to be executed by the one or more processors. The programs include instructions to provide one or more transformers configured to receive a plurality of thought objects and a prompt, wherein the plurality of thought objects comprises text present in data from communication environments, and wherein the prompt requests the one or more transformers to assign themes to each thought object.

In a preferred embodiment, the transformer determines a theme for each thought objects through a novel dual approach: either using a theme from a previously themed plurality of thought objects or using a theme identified from a plurality of unthemed thought objects.

In the supervised theming approach, an object theming transformer of the one or more transformers is provided with a list of themes and determines the probability score of the thought object, the probability score is indicative of whether the thought objects match a known theme. When the probability score is above a threshold, the thought object may be assigned to the known theme. Thought objects that are not mapped to known themes may be provided for topic identification transformer to generate theme names. Topic identification transformer uses clustering techniques to identify topics, determines an appropriate number of topics, and labels the identified topics into theme names.

The system then associates a theme with each thought object of at least a portion of the plurality of thought objects and displays the themed plurality of thought objects on a graphical user interface of a user device. This system offers significant advantages in processing and organizing large volumes of unstructured text data, with the ability to understand context, identify nuanced themes, and adapt to new content.

The transformers used in a referred embodiment may be neural transformer models or foundation models and can be fine-tuned to perform theming tasks in specific domains or industries. The invention thus provides a robust and adaptable solution for theme extraction and assignment across diverse applications and industries.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
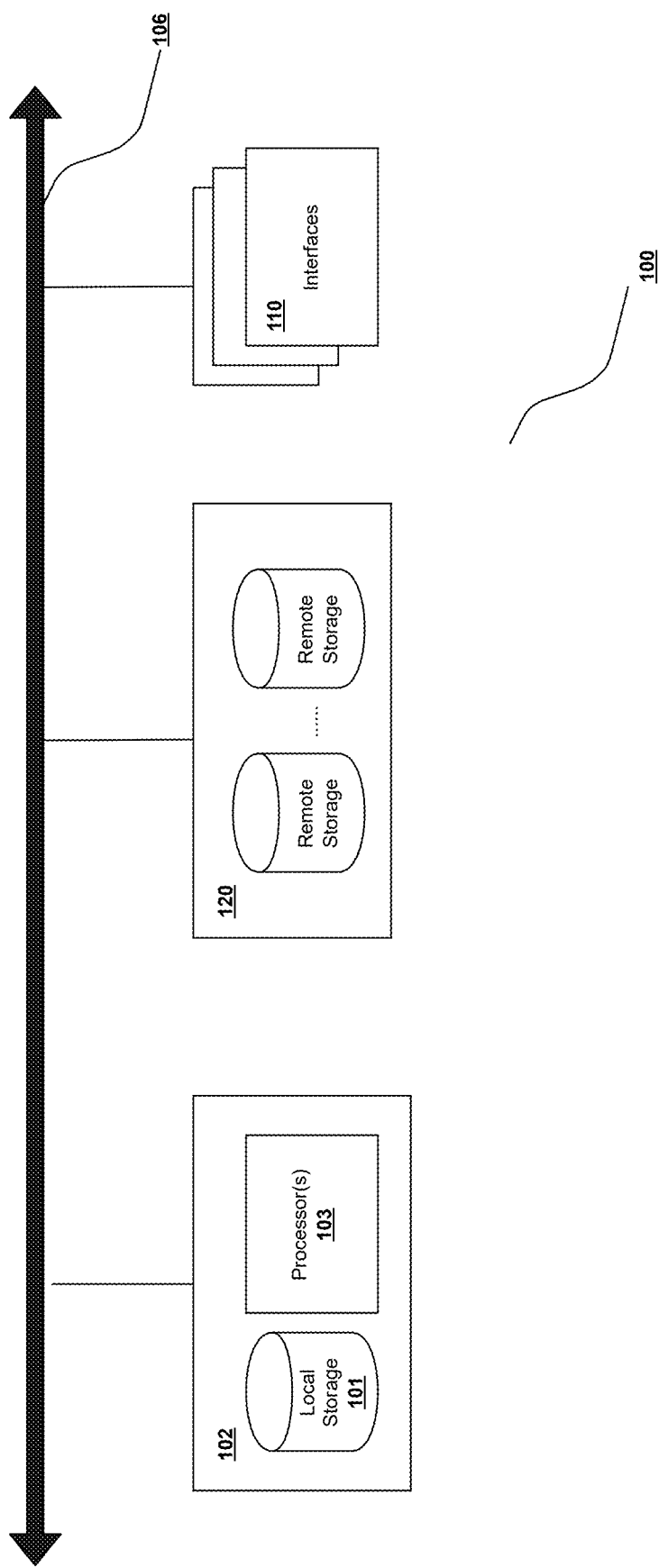
FIG. 1 is a block diagram illustrating an exemplary hardware architecture of a computing device used in an embodiment of the invention.

The inventor has conceived, and reduced to practice, a system for theming though objects using transformers. Transformer may receive a plurality of thought objects and compute an associated one or more prompts. The plurality of thought objects comprises text present in data from communication environments and the prompt requests the transformer to assign themes to each thought object.

In an embodiment, an object theming transformer is provided with a list of themes and then determines the probability score of each of the thought objects mapping to a list of themes (from previously themed thought objects). When the probability score is above a threshold, the thought object is assigned to a known theme. In an unsupervised approach, thought objects that are not mapped to known themes, are provided for topic identification to generate theme names. Topic identification transformer identifies topics, determines an appropriate number of topics, and labels the identified topics into theme names. The themes assigned and/or generated by theming transformer and topic identification transformer may then be displayed on a graphical user interface.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
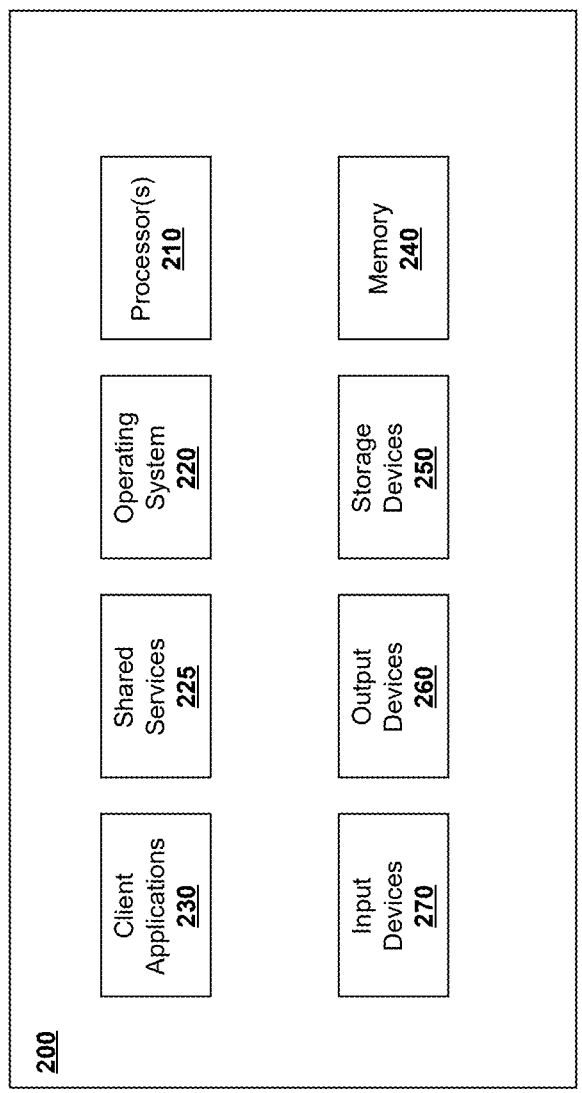
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
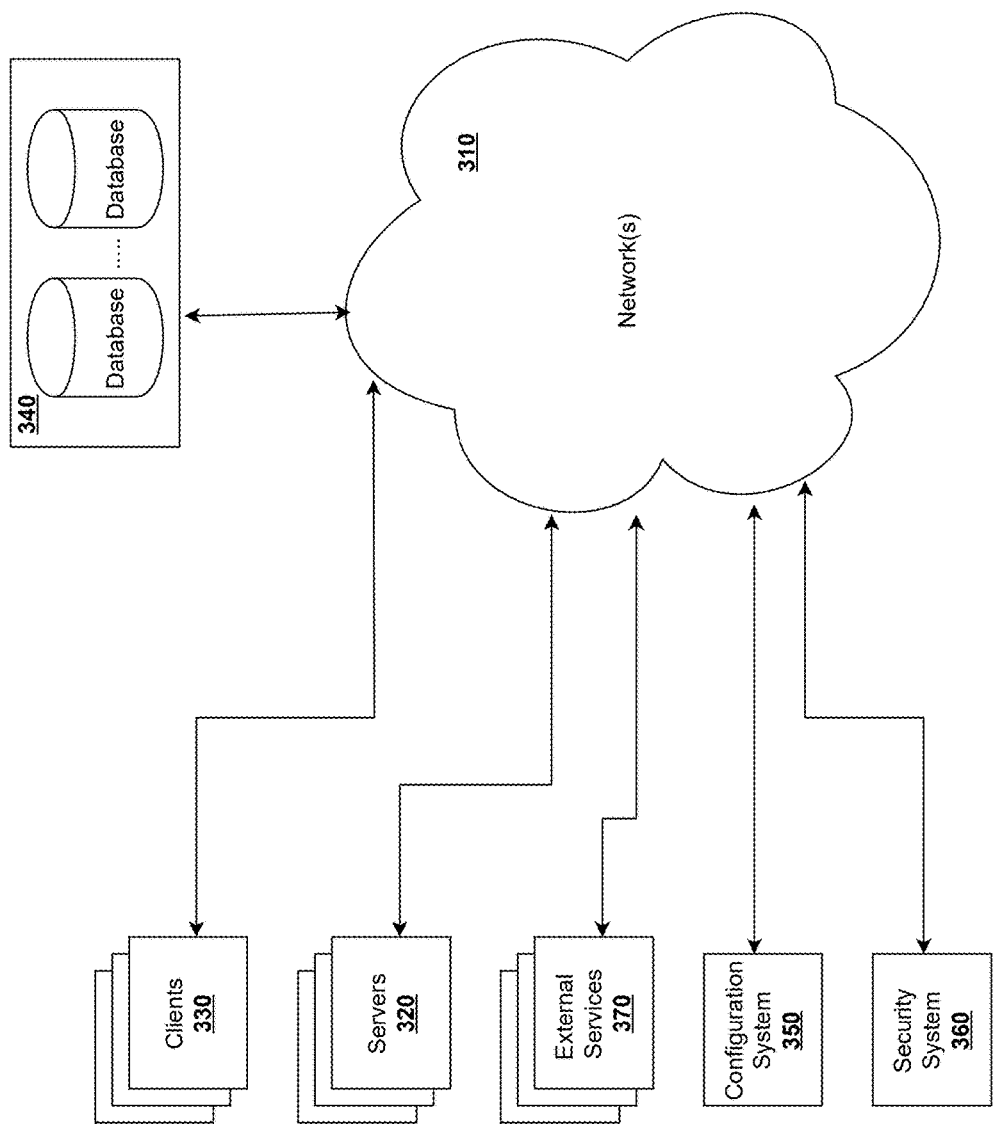
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprises or user's premise.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
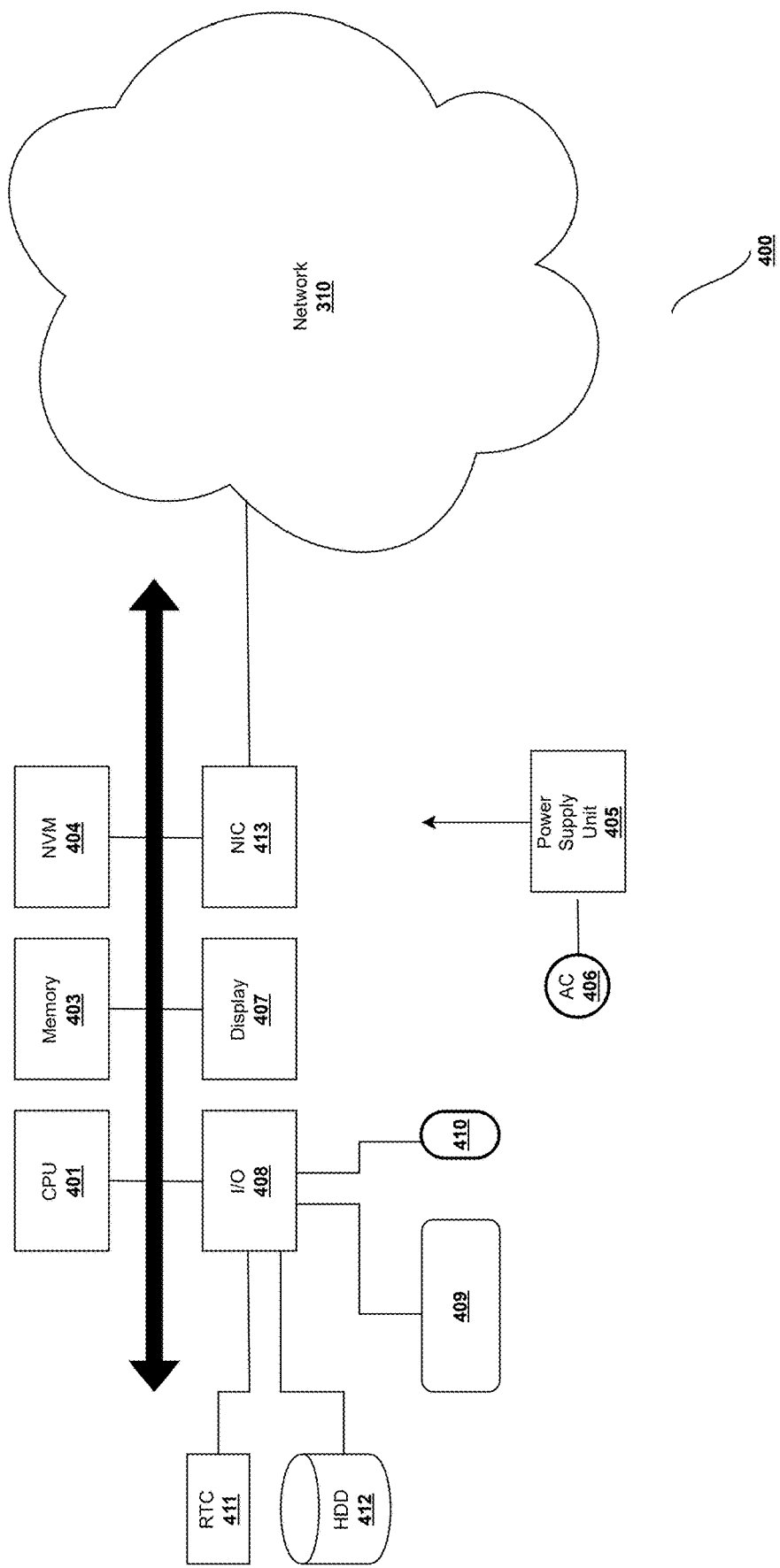
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Prompt Creation for Theming of Thought Object

Effective prompt creation is crucial for guiding transformers in the task of automatic theming of thought objects. Well-crafted prompts help the transformer understand the context, requirements, and desired output format for the theming task.

Including appropriate context in prompts is essential for achieving accurate and relevant theming results. Context helps the transformer to understand the domain, the nature of the thought objects, and the specific requirements of the theming task.

Domain-specific information may be provided in prompt. The information may be about a specific domain or an industry the thought objects relate to (e.g., customer feedback, product reviews, employee surveys). Provide relevant terminology or jargon commonly used in the domain. Thought object characteristics may be used to describe the typical length, style, and format of the thought objects. Any common features, such as informal language, abbreviations, or specific types of content may be mentioned.

Objectives related to theming task may be provided via prompt. For example, objectives may include categorizing survey feedback, identifying issues. Specify whether the theming is supervised (using predefined themes) or unsupervised (creating new themes).

Theme characteristics may be provided via prompt to define what constitutes a good theme (e.g., concise, descriptive, mutually exclusive) and guidelines may be provided on the desired granularity of themes.

Concise Prompt Creation

The systems and methods disclosed herein implement sophisticated prompt engineering protocols to orchestrate transformer operations for thematic classification of thought objects through carefully constructed instruction sets. The transformer's semantic interpretation capabilities and instruction adherence are optimized through a multi-layered prompt architecture that incorporates both declarative constraints and procedural directives.

To maximize the semantic fidelity and computational precision of transformer responses, the systems and methods employ the following architectural components:

Natural Language Understanding (NLU) Optimization: The prompt construction subsystem 619 may employ controlled vocabulary sets and syntactic templating to generate linguistically precise instructions. This approach minimizes semantic entropy while maintaining information density, facilitating accurate model comprehension through reduced ambiguity in the input space.

The prompt generation module of prompt construction subsystem 619 implements granular instruction sets with explicitly defined operational parameters for thought object classification. These parameters encompass multi-dimensional feature vectors including topic distributions, sentiment polarity metrics, stylistic markers, and other quantifiable characteristics that guide the thematic classification process.

The system employs iterative prompt refinement algorithms to eliminate potential interpretation ambiguities. Each instruction undergoes semantic validation to ensure unitary interpretation paths within the model's decision space. When semantic branching is detected through validation metrics, the system implements recursive prompt refinement until convergence on a single, deterministic interpretation vector is achieved.

The prompt engineering framework implements a hierarchical instruction architecture that optimizes for both precision and completeness in guiding transformer operations.

Input specifications are codified through formal schema definitions.

Priming a Transformer

In a preferred embodiment, the system implements a structured framework for configuring transformers to identify and classify themes. This framework includes domain context, theme characteristics, thought object formats, and example-based training.

The domain context module provides transformers with specific parameters about the analysis domain and data sources. The module defines acceptable data sources including feedback systems, electronic surveys, and topic-based discussions. It establishes terminology requirements and analytical goals specific to each domain while maintaining appropriate contextual boundaries for classification.

The thought object format module specifies requirements for processing input text. These requirements include acceptable length ranges, handling of informal language elements, processing of industry-specific terminology and abbreviations, and structural formatting rules. The module ensures consistent handling of thought objects regardless of source or format variations.

Theme characteristic specifications define how themes should be generated and applied. These specifications include requirements for theme length and descriptiveness, rules for maintaining mutual exclusivity between themes where appropriate, and parameters for theme granularity. The specifications ensure themes effectively capture the main topics and ideas present in groups of thought objects.

The example-based training component provides transformer with curated sets of thought objects and their corresponding themes to establish classification patterns. Each example includes the original thought object text, assigned theme(s), and explanation of the theme assignment rationale. This component helps calibrate the transformer's classification behavior through demonstrated examples.

For cases where thought objects may relate to multiple themes, the system implements defined handling protocols. These protocols determine when to assign single versus multiple themes based on relevance measurements and semantic relationships. The system maintains consistency by applying the same themes to thought objects expressing similar ideas or concerns.

The system ensures consistent theme application through automated detection of similar thought objects and validation of theme assignments. This helps maintain classification uniformity while accommodating natural variations in how ideas are expressed across different thought objects.

This framework prepares transformers to perform effective thematic classification while adapting to the specific requirements of different domains and use cases. The system monitors classification results and validates theme assignments to maintain high quality output across diverse sets of thought objects.

Conceptual Architecture

Figure 5:
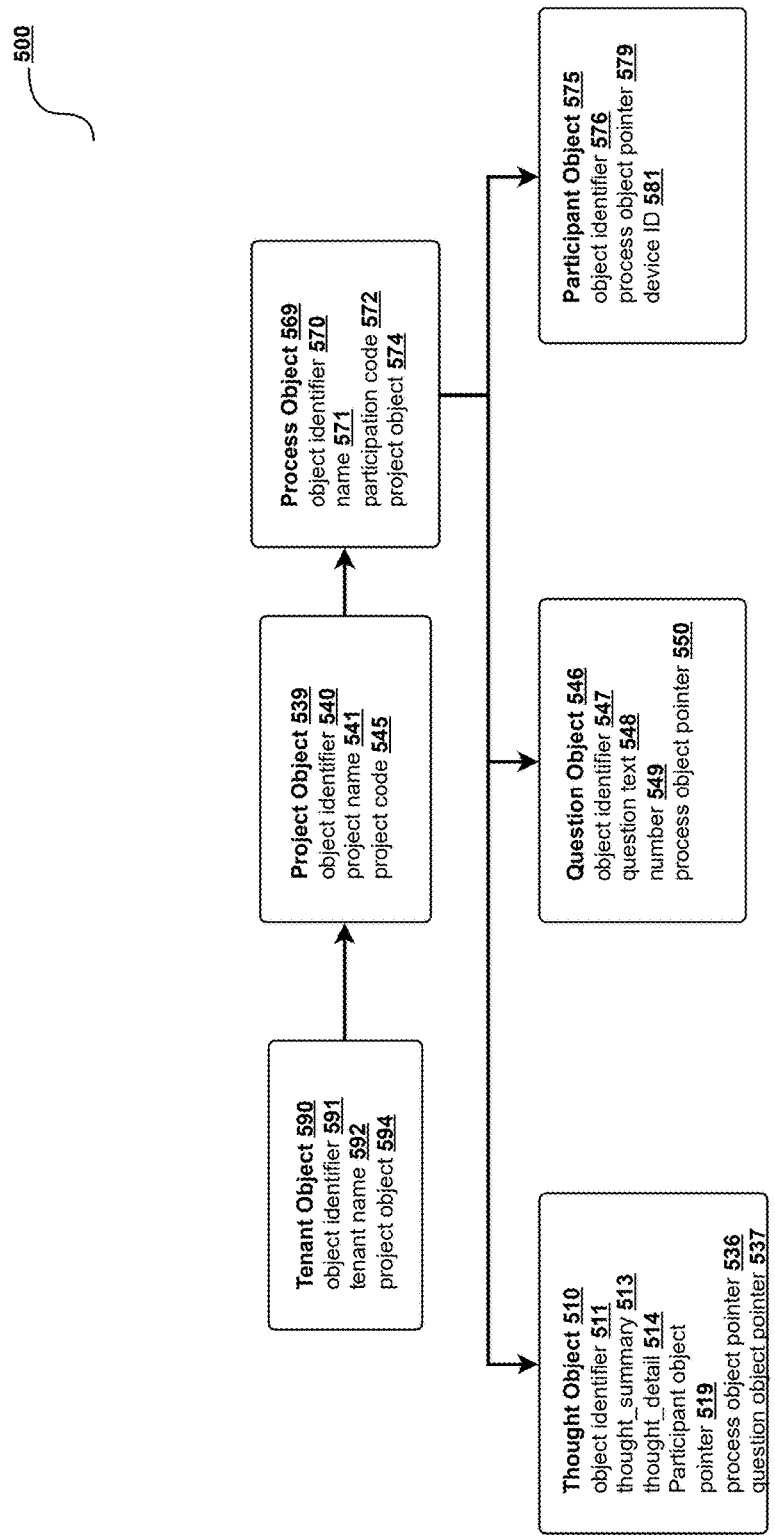
FIG. 5 is a block diagram illustrating a plurality of objects used for theming, according to a preferred embodiment of the invention.

FIG. 5 is a block diagram illustrating a plurality of objects used for thought object theming, according to a preferred embodiment of the invention. According to the embodiment, a plurality of programming instructions stored in memory 240 that when executed by at least one processor 210 comprise a plurality of objects that may comprise data, in the form of fields, often known as attributes and programming instructions, in the form of procedures, often known as methods. Objects 500 may be arranged such that procedures can access and often modify one or more data fields of an associated object. In various embodiments, programming instructions enable objects to interact with one another. In a preferred embodiment, objects 500 may be implemented in an object-relational database management system, for example, PostgreSQL and the like.

Thought objects may include data such as text present in a review, survey data, emails, Instant messaging (IM), discussion forums, or text from any other communication environment.

In an embodiment, a thought object includes a qualitative response. Qualitative response may be an open-ended, comment-style response, where the participant has the freedom to textualize associated ideas and is not constrained by pre-determined answers. Accordingly, eliciting qualitative responses may have substantial benefits over quantitative responses in that qualitative responses can provide more detailed information on participant interests, consisting of areas of alignment, sentiment, or topics, to name a few.

Accordingly, it can be appreciated that an understanding of a plurality of thought objects received from a plurality of participant devices 611 (refer to FIG. 6) provides a means for large-scale involvement of users via devices 610 in a networked environment to participate in a quantitative fashion to evaluate thought objects that require an understanding of interest regardless of device location, temporal displacement (i.e. when the respondents responded), psychology (willingness to provide qualitative responses in an open forum, or requirement for anonymity), and the like. An interest categorization may represent a collective understanding of what may be most important to at least a portion of a group of users associated with devices 610, for example, across dispersed groups such that understanding of concepts from a plurality of user devices 611 by a plurality of users.

Tenant object 590 may be a plurality of programming instructions stored in memory 240 that when executed by one or more processors 210 describe a tenant of system 600 (referring to FIG. 6), that is, a configured entity that may execute a plurality of projects described by one or more associated project objects 539 for analysis of one or more thought objects 510 received from a plurality of participant devices 611. Accordingly, one or more project objects 539, that are associated to the tenant object 590, are connected by project object pointer 594. In a preferred embodiment, tenant object 590 may comprise: an object identifier 591 whereby each instantiation of tenant object 590 may be referred to uniquely within the system 600; tenant name 592 may be a text description of the instant tenant object 501; project object pointer 594 (described above) comprises one or more pointers to one or more project objects 539. Said differently, system 600 may configure multiple tenant objects 590 whereby each tenant object 590 may be associated to a plurality of project objects 539 whereby each associated project object 539 is associated to a plurality of other objects to enable analysis of qualitative patterns for a plurality of priority values received from a plurality of participant devices 611. It should be appreciated that participant devices 611 may be at least a portion of devices 610. In a preferred embodiment, participant devices 611 may be devices that, through network 310, provided responses to, for example, a question object 546 and/or thought objects 510. In some embodiments, facilitator devices 612 (referring to FIG. 6) may be considered participant devices 610.

Project object 539 may be a plurality of programming instructions stored in memory 240 that when executed by processors 210 describe a project for an analysis of one or more thought objects 510 received from a plurality of participant devices 611, whereby a project may be a planned collaborative execution of the methods described herein utilizing one or more specially programmed components 600. Project object 539 may comprise: object identifier 540 which may be a globally unambiguous persistent identifier representing an instance of project object 539; project name 541 may be textual description of the instance of the project object 539; project code 545 may be unique identifier associated to a project object 539. Thought object 510 may be a plurality of programming instructions stored in memory 240 that when executed by processors 210 comprise an arrangement of information in the form of ideas received from device 610. Thought object 510 may comprise: object identifier 511 which may be a globally unambiguous persistent identifier representing an instance of thought object 510; thought_summary 513 may be an arrangement of information corresponding to a qualitative response from a device 610 to another arrangement of information in the form of an open-ended question from, for example, a question object 546; thought_detail 514 may be an additional arrangement of information corresponding to an additional qualitative response from a device 610, for example, an explanation of the importance of the qualitative response represented by thought_summary 513; participant object pointer 519 is a pointer to a participant object 575 who shared the instant thought object 510; process object pointer 536 may be a pointer to an associated process object 569; question object pointer 537 may be a pointer to an associated question object 546 to, for example, have access to the question object 546 through its memory address instead of a new object being created on a stack.

Question object 546 may be a plurality of programming instructions stored in memory 240 that when executed by processors 210 comprise details around the associated arrangement of information associated to a corresponding an open-ended question by, for example, as configured by a facilitator device 612 (also referred to herein as leader device 612), the arrangement of information being a point of origination for which a plurality of thought objects 510 result, are distributed by project controller 602, and for which a plurality of priority value responses are solicited from at least a portion of devices 610 to perform an analysis of qualitative patterns. Question object 546 may comprise, at least: object identifier 547 which may be a globally unambiguous persistent identifier representing an instance of question object 546; question text 548 may be an arrangement of information comprising textual description in the form of an open-ended question; number 549 may be an additional unique identifier for the instant question object 546 that may indicate an index of the instant question in a sequence or series of related question objects in a project object 539; process object pointer 550 may be a pointer to an associated process object 569, for example, to have access to the process object 569 through its memory address instead of a new object being created on a stack.

Process object 569 may be a plurality of programming instructions stored in memory 240 that when executed by processors 210 comprise an object describing a process corresponding to a project object 569 for an analysis of qualitative patterns. A process may provide a procedure for how a project is to be executed, for example, how thought objects 510 will be distributed, how responses are received and processed, and the like. Process object 569 may comprise: object identifier 570 which may be a globally unambiguous persistent identifier representing an instance of process object 569; name 571 may be textual description of the instance of the process object 569; participation code 572 may be an additional unique identifier associated to the instant process object 569; project object pointer 574 may be a pointer to a corresponding project object 539 to, for example, have access to the project object 539 through its memory address instead of a new object being created on a stack.

Participant object 575 may be a plurality of programming instructions stored in memory 240 that when executed by processors 210 comprises an object to describe a participant associated to a participant device 611 (that is, each participant object corresponds to a corresponding device 611). In some embodiments, participant objects 575 may be assigned to devices 610 that have participated (provided one or more thought objects 510 in response to a question object 546). Participant object 575 may comprise, at least: object identifier 576 which may be a globally unambiguous persistent identifier representing an instance of participant object 575; process object pointer 579 may be a pointer to an associated process object 569 to, for example, have access to the process object 569 through its memory address instead of a new object being created on a stack; project object pointer 579 may be a pointer to a project object 539 to, for example, have access to the project object 539 through its memory address instead of a new object being created on a stack; device ID 581 identifies an associated device 560. It should be noted that, in a preferred embodiment, a tenant object 590 may represent properties and methods corresponding to a user, or group of users, of the system (for example, a company, organization, or the like). Each tenant object 590 may be associated to one or more project object 539 that may provide details around a project for exchanging information following one or more processes associated to one or more process objects 569 whereby at least one question object 546 and a plurality of thought objects 510 describe an interaction by devices 610 (at least a portion of which are associated to participant objects 611).

Figure 6A:
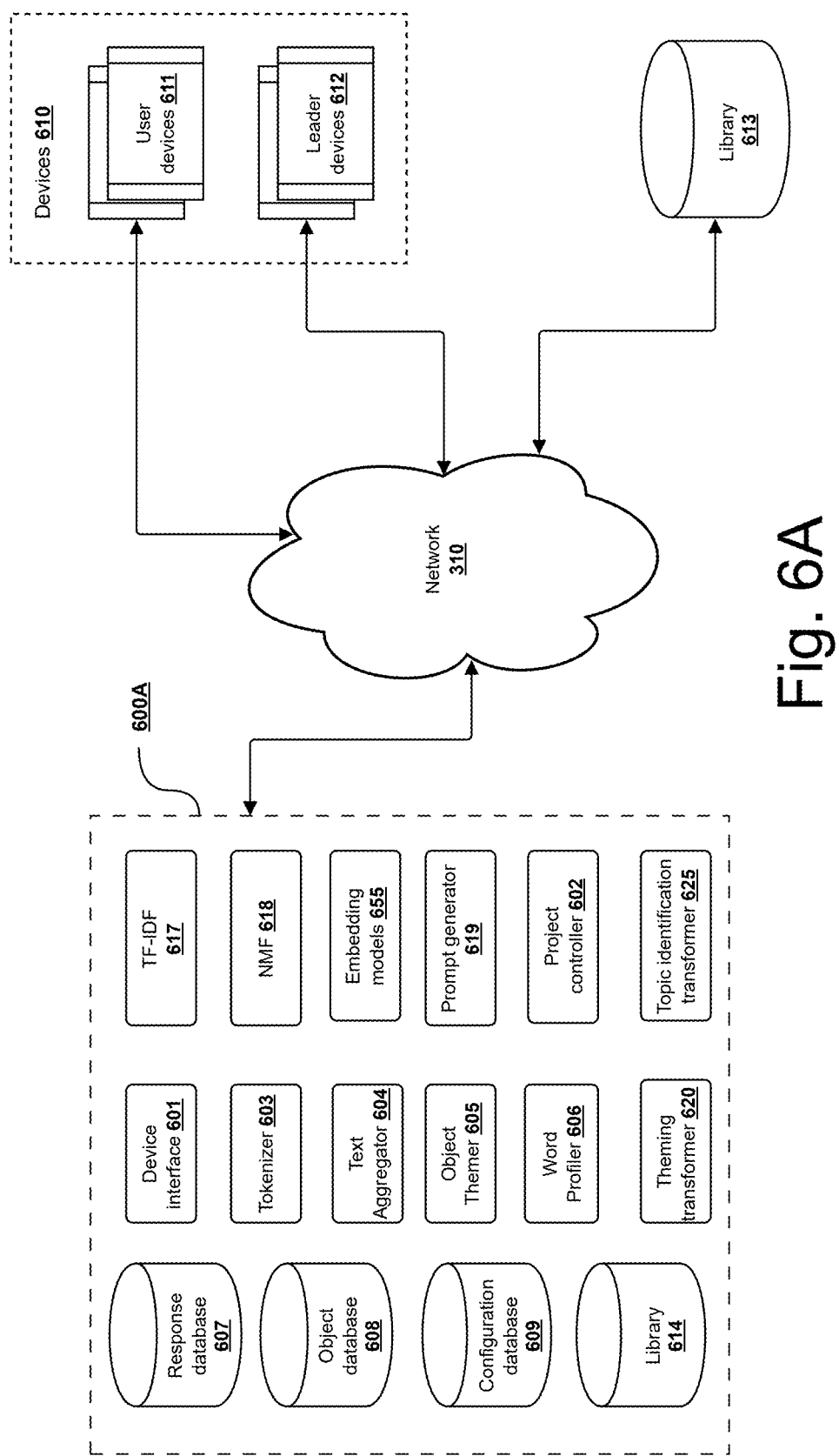
FIG. 6A is a block diagram illustrating an exemplary conceptual architecture of a thought object-theming communication environment, according to a preferred embodiment of the invention.

FIG. 6A is a block diagram illustrating an exemplary conceptual architecture of an object-theming communication environment, according to a preferred embodiment of the invention. According to the embodiment, an object theming communication environment may comprise object theming computer 600A comprising a plurality of components each comprising at least a plurality of programming instructions, the programming instructions stored in memory 240 that when executed by one or more processors 210, cause one or more processor 210 to perform operations disclosed herein. In a preferred embodiment, a question object 546 is received at a project controller 602 from a first leader device 612. The question object 546 may then be distributed, by the project controller 602 to at least a portion of a plurality of devices 611, subsequently, a plurality of thought objects 510 may be received from at least a portion of the plurality of devices 610. It should be appreciated that question objects 546 when received from a leader device 612, the objects and associated parameters may be stored in object database 608 or some other data storage location. Similarly, thought objects 510 received from at least a portion of the plurality of devices 610 may be stored in object database 608. In some embodiments, project controller 602 may process methods disclosed herein based at least in part on configuration within project object 539 and process object 569.

It should be appreciated that question object 546 and at least a portion of the plurality of thought objects 510 (and other associated objects) may be associated with at least one project object 539. In a preferred embodiment, a tenant object 590 may have one or more associated project objects 539, that is, a tenant may perform a plurality of mutually exclusive projects (also referred to herein as an exchange) to understand the dynamics and behaviors of a plurality of users via data received from a plurality of devices 610. Though in a preferred embodiment, projects are self-contained (in terms of analyses that may be performed), it should be appreciated that in some embodiments, projects may be interrelated, and calculations by system 600, may be performed across a plurality of projects.

According to some embodiments, each thought object 510 must meet certain criteria in order to qualify for inclusion into a filter and select computation, wherein such qualification may at least include a determination, by project controller 602, whether after removal of stop words and punctuations from a given thought object 510, any token (as described below) remains for further analysis, if no such token remains for analysis, such thought object 510 may not be included in the analysis by project controller 602. These criteria are combinations of meeting (or failing to meet) certain thresholds, as analyzed by a tokenizer 603, a text aggregator 604, object themer 605, and word profiler 606. Device interface 601 may manage input/output communications to devices 560, and in some embodiments, to response database 607, over network 310.

Project controller 602 may manage the execution of an exchange of thought objects 510, whereby project controller 602 may manage receiving and distributing question objects 546 to devices 610, manage to receive and distribute thought objects 510, and receive and distribute priority value objects via device interface 601.

In a preferred embodiment, tokenizer 603 segregates at least a portion of text, for example, as received in the thought objects 510. Tokenizer 603 may further separate the segregated at least portion of text into tokens, such that these tokens can be stemmed.

In a preferred embodiment, text aggregator 604 aggregates text, for example as received within the thought objects 510. The text to be aggregated may comprise, but not limited to, thought_summary 513 and/or thought_detail 514 associated with thought object 510. Text aggregator 604 aggregates text across one or more thought object 510 for themed and un-themed thought objects 510.

In a preferred embodiment, object themer 605 may be used by methods disclosed herein to generate a table of thought objects 510 that have associated themes. The table may identify all thought objects 510, that are associated with one or more themes, as determined by the stemming process, described in conjunction with methods disclosed herein. Further, object themer 605 may create a list of all unique stems across at least a portion of all thought objects 510. For instance, object themer 605 may parse thought objects 510 and extract stems for at least a portion of all thought objects 510, as generated by tokenizer 603.

In a preferred embodiment, word profiler 606 creates dictionaries and word sets. The word set may include stop words (that is, words that may be generally filtered out). In an embodiment, project controller 602 may receive one or more stop words from configuration database 609 (or in some embodiments from device 610). Word profiler 606 may then fetch at least a portion of the stop words from the project controller 602 and save them in a stopWords word set. Similarly, word profiler 606 may fill a dictionary to include one or more words that may be received by a user device 611 and/or a leader device 612.

Response database 607 may store received response information from the plurality of devices 610. Object database 608 may provide database storage for objects 500, both preconfigured and objects with assigned data fields. Configuration database 609 may provide storage for systems configuration components, for example, at least, configuration for devices 610, system components, and the like. Library 614 may be configured as an internal library internal to system 600A, having various reference libraries such as the sklearn library, NLTK stem library, spACY library, and the like. It can be appreciated by one with ordinary skill in the art that the above-referenced databases provide an exemplary set of databases required to implement components of system 600A and the data necessary to execute the disclosed methods.

Object theming computer 600A may receive a plurality of connections via network 310 from a plurality of devices 610 which may comprise participant devices 611 and leader devices 612 for receiving objects and other information. Leader device 612 may compose and configure a project object 539 associated to one or more question objects 546 to solicit a plurality of thought objects 510 based on an arrangement of information in the form of an open-ended free-flow text that may be in the form of one or more questions. In a preferred embodiment, leader devices 612 may initiate and manage a project (as defined in project object 539 that comprises one or more question objects 546 via a process defined in process object 569) and at least a portion of participant devices 611 (i.e., those devices form which data has been received by object theming computer 600A), comprise participant objects 611. In some embodiments, leader devices 612 may be considered participant devices and may act as both leader device 612 and a participant device 611.

In an embodiment, frequency-inverse document frequency (TF-IDF) 617 is a measure, used in the fields of information retrieval (IR) and machine learning, that can quantify the importance or relevance of string representations (words, phrases, lemmas, etc.) in a document amongst a collection of documents (also known as a corpus). TF-IDF 617 can be broken down into two parts TF (term frequency) and IDF (inverse document frequency). Term frequency works by looking at the frequency of a particular term you are concerned with relative to the document. Inverse document frequency looks at how common (or uncommon) a word is amongst the corpuses. IDF is calculated as follows where "t" is the term (word) we are looking to measure the commonness of, and N is the number of documents (d) in the corpus (D). In an embodiment, TF-IDF values may be computed for stems in received thought objects.

In an embodiment, Non-Negative Matrix Factorization (NMF) 618 is an unsupervised technique. NMF 618 may be configured to decompose (or factorize) high-dimensional vectors into a lower-dimensional representation. These lower-dimensional vectors are non-negative which also means their coefficients are non-negative. Using the original matrix (A), NMF will give you two matrices (W and H). W is the topics it found, and H is the coefficients (weights) for those topics. In other words, A is articles by words (original), H is articles by topics and W is topics by words.

In an example if there are 301 articles, 5000 words and 30 topics we would get the following 3 matrices:

A=tfidf_vectorizer.transform(texts),
W=nmf.components,
H=nmf.transform(A)
A=301×5000, W=30×5000, H=301×30

NMF 618 may modify the initial values of W and H so that the product approaches A until either the approximation error converges, or the max iterations are reached. In an embodiment, NMF 618 may create a matrix of tf-idf values for each of the N thought objects 510 and P stems.

In some embodiments during operation, word embeddings for the thought objects may be computed by non-transformer based embedding models 655. Non-transformer models 655 may be used for their simplicity, interpretability, and computational efficiency. Examples of non-transformer based embedding models 655 may include but are not limited to GloVe, Word2Vec, and FastText.

Embeddings can also be generated from the encoder part (630) of transformer may be referred to here as transformer-based embeddings. The encoder processes input text by capturing contextual information and relationships between words, producing high-dimensional vector representations, or embeddings, for each token. These embeddings encapsulate semantic meaning and can be utilized for various downstream tasks, such as text classification, similarity measurement, and information retrieval. By leveraging the encoder's ability to understand and represent complex language patterns, embeddings generated from transformers are highly informative and effective for similarity measurement.

In an embodiment, the embedding per thought may be calculated by combining the word embeddings using a Siamese network. A Siamese network is a type of neural network architecture that is particularly useful for similarity tasks. Rather than classifying inputs, Siamese networks learn to differentiate between inputs. When used for combining embedding inputs, whether generated by transformer-based models or non-transformer-based models, Siamese networks can employ various techniques, including but not limited to Simple Averaging or Weighted Averaging, RNN, LSTM, GRU, attention mechanisms, and pooling.

Embeddings per thought can be generated using methods such as Latent Dirichlet Allocation (LDA), Latent Semantic Analysis (LSA), or Non-negative Matrix Factorization (NMF). These methods focus on extracting topic distributions and latent semantic structures from the text, providing meaningful vector representations that capture the underlying themes and relationships within the data. These techniques are particularly useful for tasks involving topic modeling and semantic analysis.

In an embodiment, one or more transformers may be used for automatic theming of thought objects. The transformer may be a foundation model that utilizes deep learning in NLP and natural language generation (NLG) tasks. A trained transformer architecture may also be referred to as a Large Language Model (LLM). More details related to the transformers 650 may be described in FIGS. 6B-6C and FIG. 14.

Themes may include previously themed thoughts from one or more exchanges that correlate well with that exchange in a supervised framework. Themes are ideas and subjects that "connect" a set of text documents. In an embodiment, exchanges may be related to a survey conducted for a specific purpose. Any exchanges that survey similar purposes may share previously themed thoughts.

Theming of thought objects may be defined as the application of a text label to a thought object. That is, theming may include processing thought objects (e.g., text in a review or an email exchange) to mark them with labels in order to categorize them into specific classes. In an embodiment, theming may be performed by object theming computer 600A using transformers. In an embodiment, theming may be performed by object theming computer 600A without a transformer or in a combination with transformers. Transformers are a category of foundation models trained on immense amounts of data making them capable of understanding and generating natural language and other types of content to perform a wide range of tasks. Theming thought objects can be defined as the application of a text label to a thought object. That is, theming may include processing thought objects (e.g., text in a review or an email exchange) to mark them with labels to categorize them into specific classes In an embodiment, theming transformer 620 and topic identification transformer 625 may be used for processing received unthemed thoughts and assigning themes to received unthemed thought objects.

In an embodiment, theming transformer 620 may be used by object theming computer 600A for performing theming of thought objects. Supervised theming is performed when labeled training data with both input and output data are provided to the theming transformer 620. Details related to the structure and operation of theming transformer 620 are described in conjunction with FIG. 6D and FIG. 15.

In an embodiment, topic identification transformer 625 may be used by object-theming computer 600A for performing theming of thought objects. Unsupervised theming is performed when unlabeled training data with only input data and no corresponding output labels are provided. Details related to the structure and operation of topic identification transformer 625 are described in conjunction with FIG. 6E and FIG. 16. In some cases, thought objects that are not themed using theming transformer 620 are assigned themes using topic identification transformer 625.

Figure 6B:
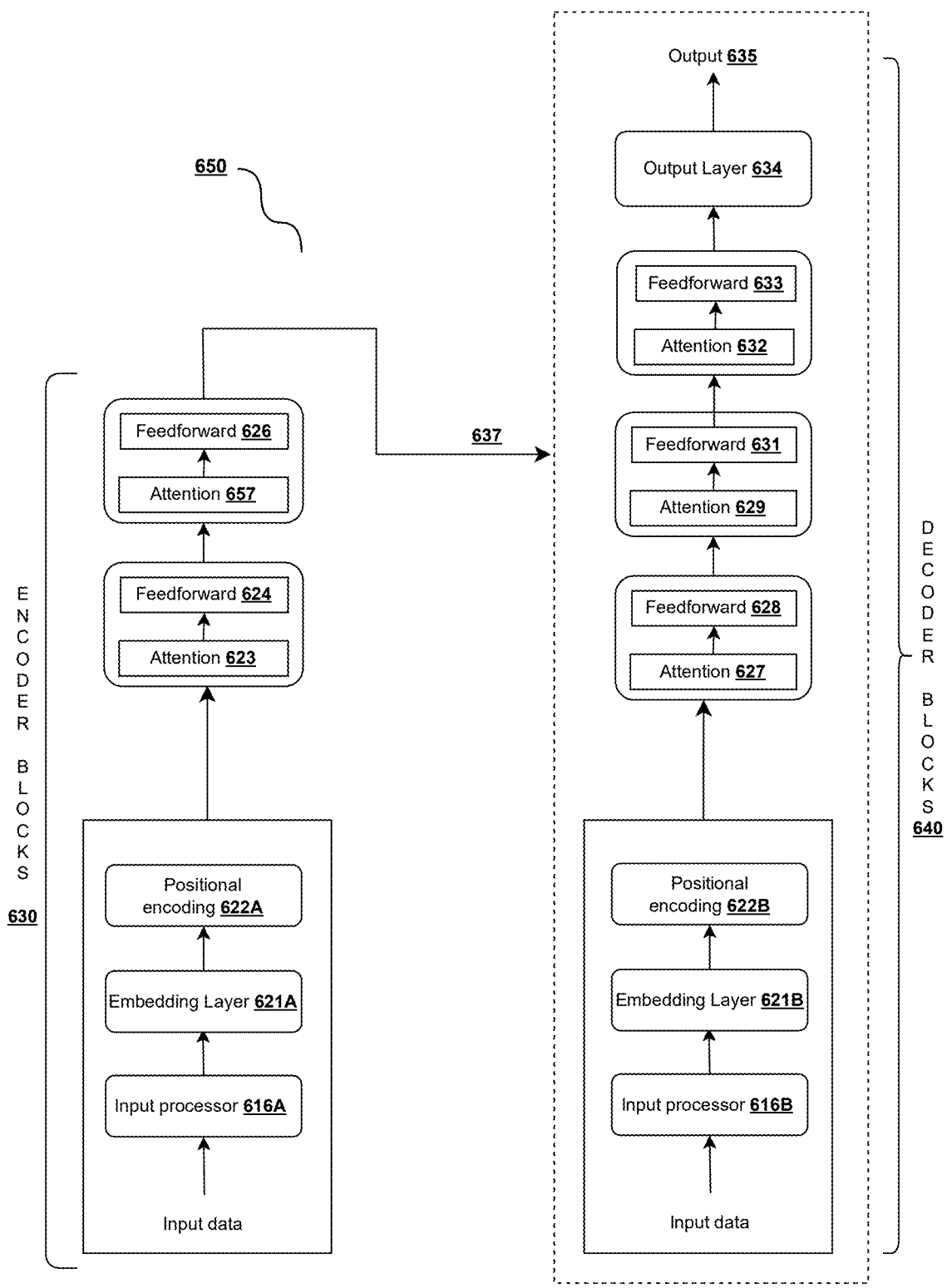
FIG. 6B is an example block diagram of a transformer architecture used for theming, in accordance with an embodiment of the invention.

FIG. 6B is an example block diagram of a transformer architecture used for theming, in accordance with an embodiment of the invention. FIG. 6B shows an encoder-decoder transformer 650 that uses both encoder blocks 630 and decoder blocks 640.

Neural transformers used for performing natural language processing (NLP) may be referred to as Foundation models or Language Models. Text processing-related tasks that can be performed by neural transformers may include but are not limited to, language translation, text summarization, speech synthesis, image processing, and question-answering systems. Transformer architecture depicted in FIG. 6B can be combined with different types of neural networks such as CNN, RNN, LSTM, transformers, etc. to enhance their capabilities and address complex problems.

In an embodiment, the encoder blocks 630 may operate independently and may be referred to an as encoder transformer 630. In an embodiment, the decoder blocks 640 may operate independently and may be referred to as decoder transformer 640.

In an embodiment, encoder transformer 630 (only encoder blocks) includes an input processor 616A for tokenization of an input sequence (herein also referred to as input data) whereby the input sequence may be split into tokens (words or sub-words) and embedded into a dense vector representation. Tokenization is cutting input data into parts (symbols) that can be mapped (embedded) into a vector space. In some embodiments, special tokens may be added to mark the beginning and end of a sequence. In an embodiment, input processor 616A includes a tokenizer with a large dataset of tokens, including all the words, punctuation signs, etc. The tokenization step takes every word, prefix, suffix, and punctuation sign, and sends them to a known token from the library.

Embedding layer 621A converts discrete tokens (such as words, sub word, or characters) into continuous vector representations, (herein also referred to as embeddings), In some embodiment, embedding layer 621A may use pre-trained word embeddings (e.g., Word2Vec, GloVe) or sub-word embeddings (e.g., Byte Pair Encoding or WordPiece), however, advantageously, embedding layer 621A may also handle various levels of granularity for tokens, including words, sub words, or even characters. Accordingly, embedding layer 621A may receive input as a sequence of tokens. Each token may be represented as an integer or a one-hot encoded vector, indicating its position in a predefined vocabulary. Embedding layer 621A may map each discrete token to a continuous vector in a high-dimensional space. These continuous vector embeddings may capture the semantic meaning and context of the tokens. For instance, tokens with similar meanings should have embeddings that are close in vector space. Embeddings may be learnable parameters of a model whereby, during training, the model may learn to adjust embeddings to minimize a loss function by making them informative about the input data. This means that the embeddings may be updated via backpropagation during the training process. It should be noted that embeddings, from embedding layer 621A, are high-dimensional vectors, often with hundreds of dimensions. This high dimensionality enables the model to capture fine-grained relationships and nuances between tokens in the input data. It also allows the model to learn complex patterns and hierarchies within the data. In some embodiments, the same embeddings may be shared between input and output layers to reduce the parameter count of the model and enhance efficiency. Accordingly, sharing embeddings may help maintain consistency between input and output representations.

Positional encoding 622A may provide information about the order of words whereby positional encoding is added to the word embeddings to provide information about the token's position in a sequence to provide a model with information about the position of each token in the input sequence for capturing sequential dependencies in data comprised within the input sequence. Accordingly, the model may process all tokens in the input sequence in parallel. In a preferred embodiment, positional encoding 622A may treat each token independently and inject information about the position of each token. In some embodiments, positional encoding 622 may learn encoding during training and such encoding may be added to the token embeddings in a way that it varies across dimensions and positions. In some embodiments, positional encoding 622A may use sinusoidal encoding by using a combination of sine and cosine functions with different frequencies and phases to ensure that a positional encoding is unique for each position while capturing a relative position of tokens effectively. According to the embodiment, using sinusoidal functions, positional encoding 622A may introduce a sense of periodicity to the embeddings, allowing the model to distinguish tokens at different positions. A choice of frequencies may ensure that tokens with different positions have distinct positional encodings. This may help the model learn dependencies that are based on the order of tokens. Further according to the embodiment, during each forward pass of the model, positional encoding 622A may modify each token's embedding based on its position in the sequence, making it unique and informative with respect to its position. Positional encoding 622A may function in conjunction with self-attention mechanisms within the architecture to attend to different parts of the input sequence based on the content of the tokens and the positional information. This allows the model to give appropriate attention to contextually relevant tokens. Advantageously, positional encoding 622A provides a learnable component whereby during training, the model learns appropriate encoding patterns that may best capture the sequential dependencies in the training data. This means that the model can adapt to sequences of different lengths and patterns. Positional encoding 622A may provide the model with the necessary information to understand the order and relationships between tokens in the input sequence for processing natural language tasks and other sequence-based tasks in deep learning. Input processor 616A works with token embeddings and positional encodings (from positional encoding 622A) combined with parallel processing and self-attention mechanisms for efficient and effective machine translation, text generation, sentiment analysis, and the like.

In an embodiment, each layer of encoder transformer 630 comprises a feed-forward component and an attention component. In an embodiment, the first layer includes attention 623 and feed-forward 624. The second layer includes attention 657 and feed-forward 626.

Attention component may be used for deciding which parts of the input sequence are important for each token/sub-token, especially when decoding long sequences since the encoder is limited to encoding a fixed-size vector. Attention mechanisms gather information about the relevant context of a given token/sub-token and then encode that context into a vector that represents the token/sub-token. It is used to identify the relationships between tokens in the long sequence while ignoring other sub tokens that do not have much bearing on a given prediction.

In an embodiment, feed-forward is a feed-forward neural network. After the self-attention mechanism, the encoded representations pass through a feed-forward neural network (FFNN) in each layer. This FFNN consists of two linear transformations separated by a non-linear activation function, such as the Rectified Linear Unit (ReLU). The FFNN helps capture complex patterns and relationships in the encoded representations, enabling the model to learn higher-level features.

In an embodiment, the attention component utilized in encoder transformer 630 layers may be a self-attention mechanism that allows a token to weigh the importance of every other token in the sequence when encoding information. However, a single self-attention mechanism may not be sufficient to capture various types of dependencies within the data, therefore, a multi-head self-attention mechanism addresses this limitation. Accordingly, the multi-head self-attention mechanism applies the self-attention operation multiple times in parallel, with each head (that is, a separate and parallel processing pathway that independently attends to different aspects or patterns within the input sequence) having its own set of learnable parameters (for example, for query, key, and value projections). Each head can focus on different aspects of the input, enabling the model to capture diverse patterns and relationships.

Each encoder layer comprises a feed-forward component whereby after attention, the information passes through a neural network that may perform a transformation to introduce non-linearity into the model as modeled data relationships disclosed herein are non-linear. This transformation allows the model to learn relevant features or representations of the input data. Further, by iteratively stacking multiple encoder layers, transformer architecture can effectively capture complex patterns and dependencies in the input sequence, leading to state-of-the-art performance in various natural language processing tasks such as machine translation, text generation, and sentiment analysis.

Output layer 635 comprises a liner layer and a SoftMax layer. The linear layer is a fully connected neural network that projects the raw scores output by the last layer of the neural network into a logit vector. The SoftMax layer applies the softmax function to the logits vector to compute a vector that represents the probability distribution of a list of potential outcomes. In some embodiments, attention scores may be calculated and scaled and then passed through a softmax function to obtain the attention weights. These weights may determine how much each token may contribute to the output of the self-attention operation. Tokens that are more relevant to the current token may receive higher attention weights.

In an embodiment, decoder transformer model 640 includes a positional encoding 622B, an embedding layer 621B, and a processor 616B performs the same function as positional encoding 622A, embedding layer 621A, and processor 616A described for encoder transformer 630.

In an embodiment, each layer of decoder transformer model 640 comprises a feed-forward component and an attention component. In an embodiment, the first layer includes attention 627 and feed-forward 628. The second layer includes attention 629 and feed-forward 631. The third layer includes attention 632 and feed-forward 633.

In an embodiment, attention component of decoder layers includes a masked self-attention component. The masked self-attention component allows the neural network to identify certain features or inputs. The inputs to the decoder block are added with the positional embeddings 622B. Decoder layers may be configured to predict each token/subtoken in the target language one-by-one at each time step conditioned on all previously generated target tokens/subtokens. The masked self-attention component in each layer masks the output embeddings from future time steps. The feed-forward neural network processes each output embedding separately.

Output layer 634 includes a linear layer and a SoftMax layer. Blocks of decoder transformer model 640 may be capped off with a linear layer that acts as a classifier, and a softmax to get the word probabilities Linear layer projects the vector produced by the stack of decoders into a logits vector, and the softmax layer then turns the scores of the logits vector into probabilities for each token in the vocabulary which are positive and normalized.

The transformer architectures described above can be used as a model for performing NLP-related functions. A trained transformer architecture is referred to as a Large Language Model (LLM). LLM may be a foundation model that utilizes deep learning in NLP and natural language generation (NLG) tasks. To help them predict the complexity and linkages of language, language models are pre-trained on a vast amount of data. Transformer may be trained using a large dataset of text paired with appropriate labels (e.g., responses in a conversational dataset). Training involves minimizing a loss function (e.g., cross-entropy) between the predicted output and the actual target sequence. Accordingly, the model learns patterns and relationships within the data to enable the model to make accurate predictions, and classifications, or generate desired outputs when presented with new, unseen data. Training begins with the collection of a dataset that consists of input data (features) and corresponding target labels or ground truth values. The dataset may be representative of the problem the methods disclosed herein is intended to solve. The large language model or language model structure, architecture, and parameters may be defined to include neural networks, decision trees, support vector machines, and more, depending on the nature of the task. Training may include the use of a loss function, also known as a cost or objective function, is chosen to measure the difference between the model's predictions and the true labels in the training data. The goal is to minimize this loss, as it quantifies the model's performance. Training may utilize an optimization algorithm to adjust the model's parameters (e.g., weights and biases) during training in a way that minimizes the loss. Optimization algorithms may include stochastic gradient descent (SGD), Adam, and RMSprop. During training, data may be fed through the model in a forward pass to make predictions, a loss is then calculated, and gradients of the loss with respect to the model parameters may be computed in a backward pass. Parameters may be updated using the gradients and the chosen optimization algorithm. The learning rate, which determines the step size of parameter updates, may be adjusted. Training may be performed iteratively for multiple epochs (complete passes through the training data) in order to improve the model's performance with each epoch, gradually reducing the loss. During training, a separate validation dataset may be used to monitor the model's performance on data it hasn't seen before. This helps detect overfitting and guides hyperparameter tuning. After training is complete, the model is evaluated on a test dataset that it has never seen. This provides a final assessment of the model's generalization performance. Based on NLP related task, a transformed model architecture is selected.

In an embodiment for encoder-decoder transformer 650, the processing is performed using multiple layers of encoder transformer 630 and decoder transformer 640. Encoder transformer 630 processes the input data and transforms it into a different representation, which is subsequently decoded by decoder transformer 640 to produce the desired output. The output 637 of the top encoder layer is a set of attention vectors K and V which is used by the multi-head attention layer of the decoder blocks 640. Encoder-decoder transformer 650 may be implemented for tasks where an input sequence needs to be transformed into an output sequence, such as machine translation. The encoder blocks 630 processes the input sequence and compresses the information into a "context vector," and the decoder blocks 640 then uses this context vector to generate the output In a transformer using encoder transformer 630, attention is trained on a large unsupervised training dataset of source code and natural language source code summaries. The encoder transformer 630 may be then fine-tuned by a fine-tuning component with a particular supervised training dataset for a particular downstream task to produce a corresponding model.

In a transformer using encoder transformer 630 is suited for classification tasks due to the type of attention used in the encoder. Encoder transformer 630 architecture is often employed in tasks like text classification, sentiment analysis, embedding generation, text generation, language understanding, document classification, and question answering. BERT™ (Bidirectional Encoder Representations from Transformers) is a widely used Encoder-only model. It has been pre-trained on a large corpus of text and can be fine-tuned for specific NLP tasks.

In a transformer using with decoder transformer model 640, is an auto-regressive model that produces an output one element at a time based on the outputs of previous time steps. Code completion is best suited for a decoder transformer model 640 since it is an auto-regressive task that predicts an ordered sequence of tokens where the order depends on the preceding tokens in the sequence. Decoder transformer model 640 uses a masked self-head attention which is best suited for auto-regressive tasks since it is explicitly trained to generate auto-regressively. This type of neural transformer model is best suited for text generation, summarization, text completion, language modeling, text correction, and dialogue systems.

Generating text that is both coherent and contextually consistent is a significant challenge in many NLP tasks, such as text generation, machine translation, and content summarization. Decoder-only transformer architectures have been designed to address this problem. GPT (Generative Pre-trained Transformer) models such as GPT-2 and GPT-3 utilize a Decoder-only structure to generate coherent and contextually relevant text.

In decoder transformer model 640, the multi-head self-attention mechanism in the decoder layers is similar to the one in the encoder layers, but it is masked to prevent the model from attending to future positions, ensuring that the predictions for position "i" can depend only on the known outputs at positions less than "I." This masking happening internally in the decoder's multi-head self-attention mechanism) is essential to maintain the autoregressive property of the transformer model during training and inference. The autoregressive property ensures that the model generates output tokens one at a time and uses previously generated tokens as context for generating the next word token. Decoder transformer model 640 may often employed for text generation, and larger ones display strong zero-shot inference abilities, performing well across a range of tasks. Zero-shot learning (ZSL) is a machine learning scenario in which an AI model is trained to recognize and categorize objects or concepts without having seen any examples of those categories or concepts beforehand. They can perform tasks with limited or no task-specific training data by leveraging the knowledge acquired during pre-training. This is particularly useful in scenarios where labeled data is scarce or when adapting. Further, decoder-based models, particularly those with a large number of layers and attention heads, can capture long-range dependencies in the generated text. They can maintain coherence and consistency over longer sequences, which is important for tasks that require generating longer passages of text. Notable examples of decoder-based autoregressive models are GPT (Generative Pre-trained Transformer), Megatron-LM Transformer-XL, CTRL (Conditional Transformer Language Model).

In some embodiments, decoder transformer 640 may offer the ability to control the generated text by conditioning on specific prompts, attributes, or styles. By providing appropriate prompts or control codes, the model may be guided to generate text with desired properties, such as sentiment, topic, or writing style. This controllability is valuable for applications like content creation, personalization, and dialogue systems.

Figure 6C:
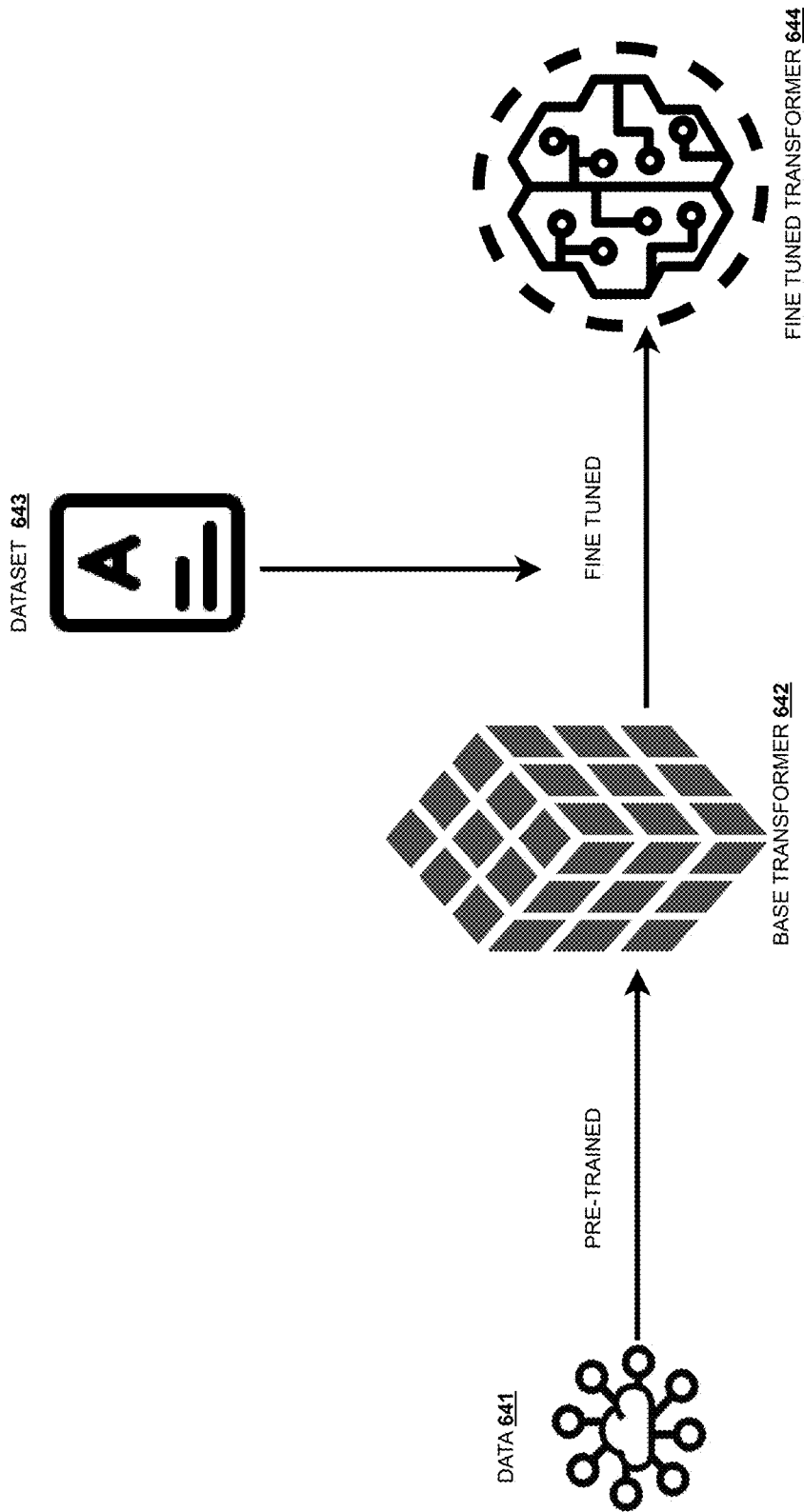
FIG. 6C is an example block diagram depicting the generation of a fine-tuned transformer for tasks associated with object theming, in accordance with an embodiment of the invention.

Referring now to FIG. 6C, a block diagram for the generation of a fine-tuned transformer for tasks is described. A base transformer 642 is a pre-trained language model. Pre-trained language models may be released in various sizes, ranging from small to large, with the base version being one of the smaller configurations. Generally, base transformer are trained on large volumes of internet data/text 641 to understand and predict linguistic patterns. Examples of base transformers 642 may include GPT-3, GPT-4, or BERT. These models vary in size; the smaller configurations, although less complex, are quicker to train and deploy than their larger counterparts. Nevertheless, they still deliver robust performance across diverse natural language processing tasks. Base transformer may have fewer parameters compared to their larger counterparts, making them more lightweight and faster to train and deploy. While they may not capture as much complexity and nuance as larger models, they still offer strong performance across a variety of natural language processing tasks. Additionally, base transformer may often used as a starting point for fine-tuning specific downstream tasks or as a component in larger, more specialized models. To use an existing (base) transformer for specific tasks or technology areas, transformer 642 may be tuned as per the target technology area/use case/domain. During fine-tuning, parameters of transformer 642 are adjusted based on the new dataset, helping it better understand and generate content relevant to the specific task. This process retains the general language knowledge gained during pre-training while tailoring the model to the nuances of the target domain.

A fine-tuned transformer 644 is generated by fine-tuning a base transformer 642 and training it on a specific and smaller dataset for a specific task using dataset 643. In an embodiment, dataset 643 is a training dataset that provides instructions. Once the instruction data set is ready, as with standard supervised learning, the data set may be divided into training validation and test splits. During fine-tuning, prompts from your training data set are selected and passed through base transformer 642, which then generates completions.

During the fine-tuning phase, when the model is exposed to a newly labeled dataset 643 specific to the target task, it calculates the error or difference between its predictions and the actual labels. The model then uses this error to adjust its weights, typically via an optimization algorithm like gradient descent. The magnitude and direction of weight adjustments depend on the gradients, which indicate how much each weight contributed to the error. Weights that are more responsible for the error are adjusted more, while those less responsible are adjusted less. Over multiple iterations (or epochs) of dataset 643, the model continues to adjust its weights, refining on a configuration that minimizes the error for the specific task. The aim is to adapt the previously learned general knowledge to the nuances and specific patterns present in the new dataset, thereby making the model more specialized and effective for the target task. During this process, the model is updated with the labeled data. It changes based on the difference between its guesses and the actual answers. This helps the model learn details found in the labeled data. By doing this, the model improves at the task for which it's fine-tuned.

In an embodiment, base transformer 642 may be fine-tuned using a pre-defined prompt with rules, instructions, context, and dataset to perform tasks related to object theming. In one embodiment, a prompt may include instructions that can guide a generic transformer to perform tasks related to supervised object theming. The generic transformer once fine-tuned may be referred to as theming transformer 620. In another embodiment, the prompt may include instructions that can guide a generic transformer to perform tasks related to unsupervised object theming. The generic transformer once fine-tuned may be referred to as topic identification transformer 625.

Figure 6D:
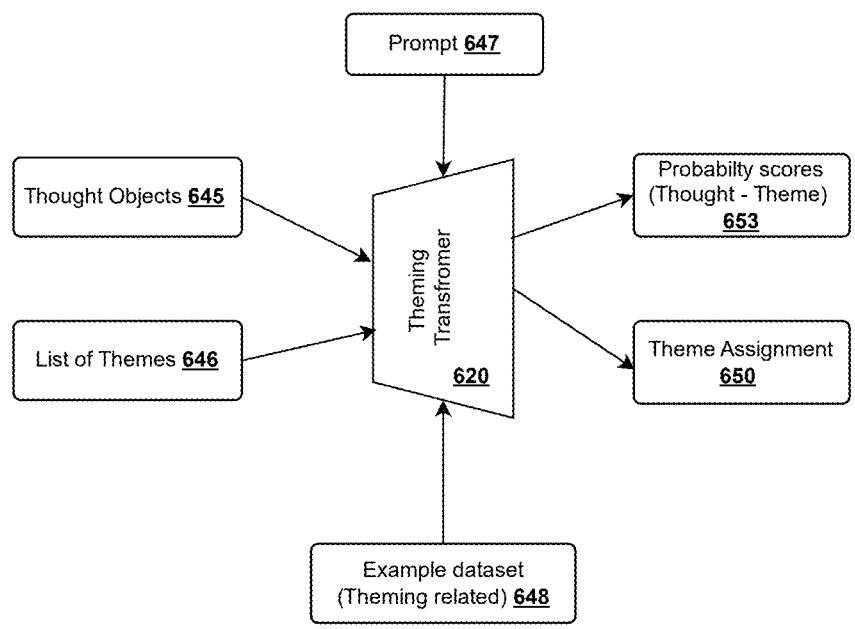
FIG. 6D is a block diagram depicting the use of theming transformer, in accordance with an embodiment of the invention.

FIG. 6D is a block diagram 600D depicting the use of theming transformer 620, in accordance with an embodiment of the invention. In an embodiment, theming transformer 620 is fine-tuned transformer is configured to process received unthemed thought objects 645, list of themes 646, and prompt 647. The prompt is designed to provide context data, format requirements, and instructions for theme assignment In an embodiment, prompt 647 may be a prompt assignment provided to the theming transformer 620 to determine if thought objects map to known themes in the list of themes 646. Theming transformer 620 may be configured to analyze each text input/document (i.e. thought object) and determine a probability scores (0-1) for each topic mapping to a known theme. The prompt may provide instruction to return results in JSON format with text IDs and probability scores 653.

In an example, the prompt 647 may be as below,
PROMPT_ASSIGNMENT="You are an advanced text processing transformer.
Input Provided: —A list of predefined topics, and A batch of text documents
Task: Evaluate how likely each given topic appears in each text document.
Scoring Instructions:
Assign probability scores between 0 and 1 for each topic-text combination
0 means the topic is not present
1 means the topic is strongly present
Required Steps:
1. Read and analyze each text document thoroughly
2. For each text document, evaluate its relevance to each topic
3. Calculate probability scores for all topic-text pairs
4. Format results as JSON objects
Output Format:
[{"textId": "1", "probabilities": {"topic1": 0.75,//High probability "topic2": 0.95,//Very high probability "topic3": 0.10//Low probability}}, {"textId": "2", "probabilities": {"topic1": 0.65, "topic2": 0.85, "topic3": 0.20}}]"

In some embodiments, theming transformer 620 may utilize example dataset 648 to learn to theme and assign themes 650 to received thought objects. Theming by theming transformer 620 may use labeled list of themes 646 to classify received thought objects.

During operation, theming transformer 620 may be provided with unthemed thought objects 645 and a list of themes 646 and a prompt 647, and the theming transformer 620 determines whether the thought object is mappable to a known themes in the list of themes 646. Theming transformer 620 determines whether a probability score is greater than a pre-defined threshold, wherein the probability score is indicative of the thought object mapping to a known theme.

In an embodiment, pre-defined threshold value may be set between, for example, 0.4 and 0.8. The pre-defined threshold value may be configured based on domain, and/or precision requirements.

Theming transformer 620 may store multiple lists of themes associated with respective domains. When the thought matches a known theme, a theme is assigned to the thought object. When the probability score is not greater than the pre-defined threshold then, the thought object does not map to any theme is the list of themes 646, any remaining unthemed thought objects are sent to topic identification transformer 625 for generating new theme names.

Figure 6E:
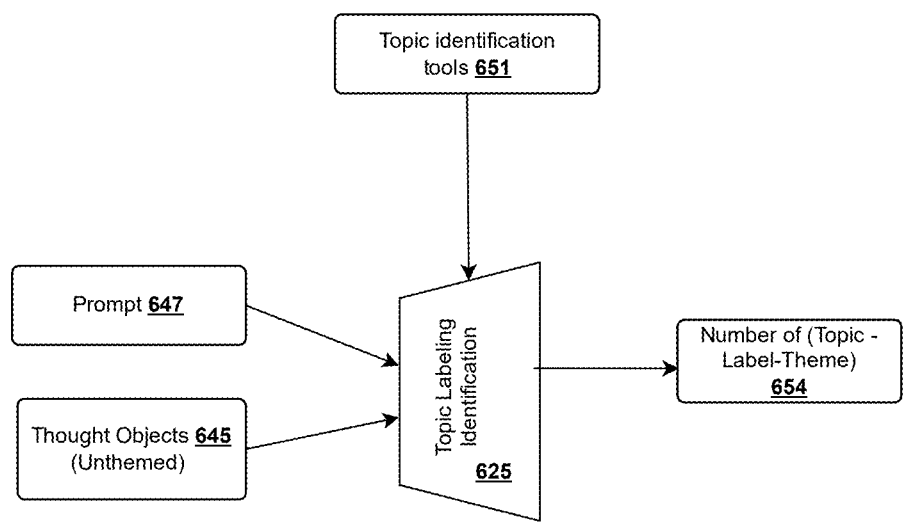
FIG. 6E is a block diagram depicting the use of a topic identification transformer, in accordance with an embodiment of the invention.

FIG. 6E is a block diagram depicting the use of topic identification transformer 625, in accordance with an embodiment of the invention. In an embodiment, topic identification transformer 625 is a fine-tuned transformer configured to process received thought objects 645 and assign themes to received unthemed thought objects 645.

During operation, object theming computer 600A uses topic identification transformer 625 to assign themes to received thought objects after theming is performed by theming LLM 620. Un-themed thought objects are provided to topic identification transformer 625 from the theming transformer 620. Topic identification transformer 625 makes use of topic identification tools 651 to identify topics and determine the number of topics 654. Details related to the operation of topic identification transformer 625 are described in FIG. 16.

During operation, topic identification transformer 625 may be provided with unthemed thought objects 645 and a prompt, and topic identification transformer 625 determines topics in thought objects and creates a theme name 649 for the topics identified in thought objects.

In an embodiment, prompt 647 may be as below:
DEFAULT_PROMPT_CATEGORY=
""""Input Text: {sampled Thoughts}
Task: Extract and rank theme categories from the provided text.
Category Requirements:
1. Length: Each category must be 2-3 words
2. Content: Each category must represent a significant theme or topic
3. Language: Use the same language as the input text
Category Rules: —Focus on major themes, not isolated phrases—Each category must be unique and distinct—Avoid overlapping or nested categories—No redundant or repetitive categories
Output Format: —
1. List categories on separate lines with numbers (1, 2, 3, etc.)—
2. Rank from most frequent (1) to least frequent—
3. Maximum 15 categories—If fewer than 15 meaningful categories exist, list only those that are clearly defined
Example Output:
1. Customer Service Quality
2. Product Performance Issues
3. User Interface Design [ . . . continue until all distinct categories are listed]
In another embodiment, prompt 647 may be as below:
STABLE_PROMPT_CATEGORY=""""
Input:
Text to analyze: {sampled Thoughts}
Previously used themes: {previous Themes}
Task: Extract and rank theme categories while maintaining consistency with previous themes.
Primary Rules:
1. Reuse Previous Themes: —Check each previous theme for semantic similarity with current text—Keep previous themes that match current content—Skip previous themes that don't match
2. Category Requirements: —Length: 2-3 words per category—Language: Use same language as input text—Format: List each category on a new line with numbers
3. When Creating New Categories: —Avoid nested categories (one category containing another)—Ensure each category is distinct
Output Format:
Rank categories from 1 to 15 (1=most frequent)
List each category on a new line with its rank—Include both reused and new categories in ranking
Example Output:
1. Product Performance Issues (reused from previous themes)
2. Customer Support Quality (new category)
3. Interface Design Elements (reused from previous themes) [ . . . continue until all categories are listed]""""

A STABLE prompt may be used to maintain consistent themes across multiple analyses.

The DEFAULT prompt may be useful for starting fresh categorization without historical bias, and without maintaining consistency with previous analyses.

Figure 16:
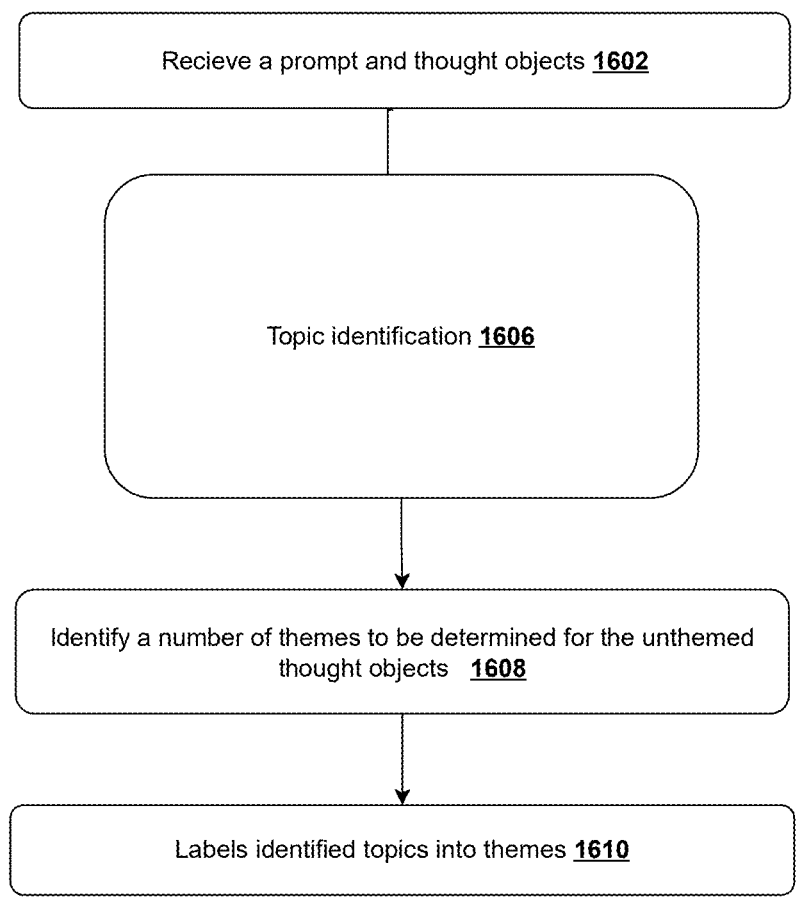
FIG. 16 is a flow diagram illustrating a method for theming of thought objects, according to an embodiment of the invention.

Details related to the operation of topic identification transformer 625 using default prompt or stable prompt is described in conjunction with FIG. 16.

Detailed Description of Exemplary Embodiments

Figure 7:
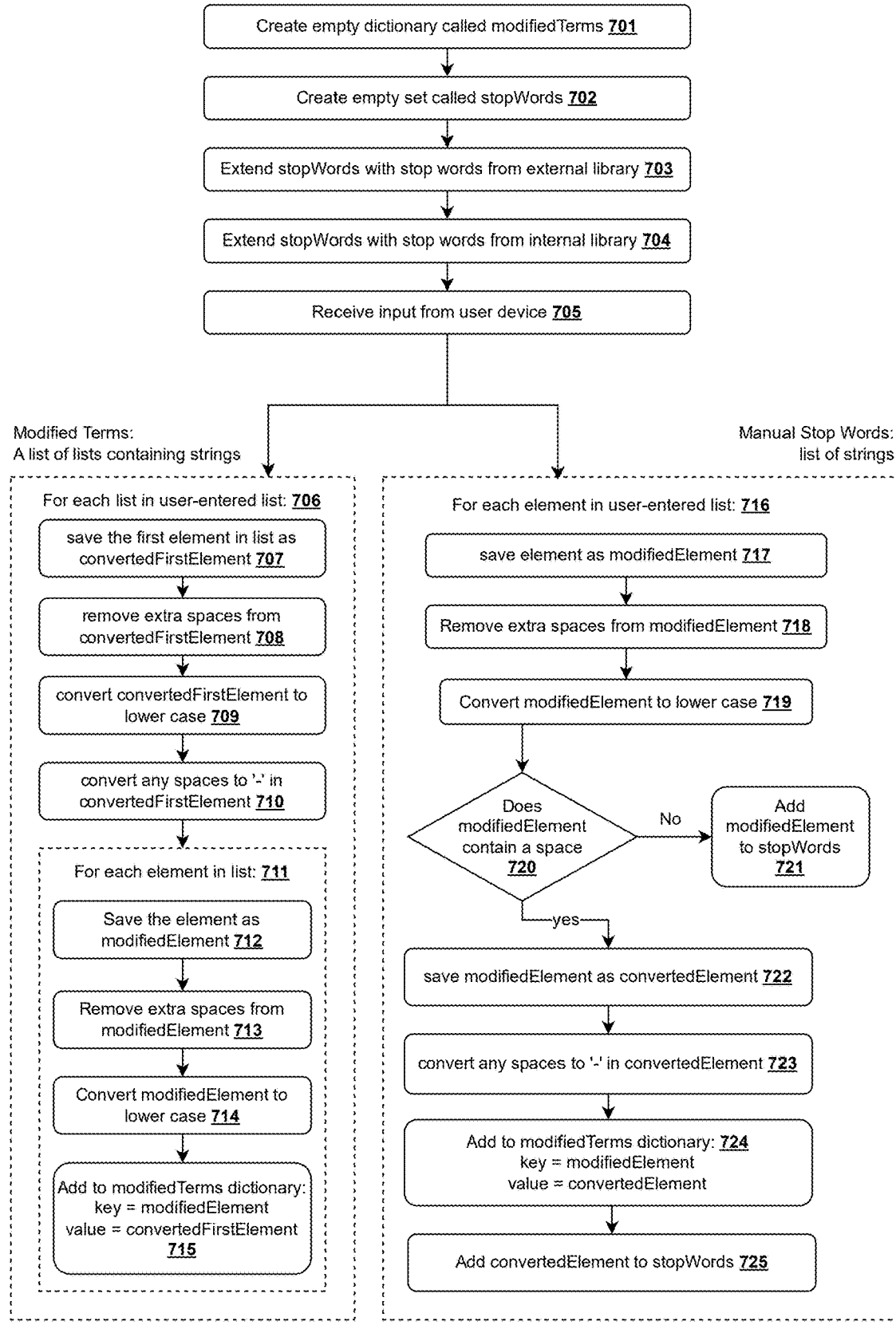
FIG. 7 is a flow diagram illustrating a method for initializing supporting variables, according to a preferred embodiment of the invention.

FIG. 7 is a flow diagram illustrating a method for initializing supporting variables, according to a preferred embodiment of the invention. According to the embodiment, in the first step 701, word profiler 606 may create an empty dictionary. The empty dictionary may be labeled as modifiedTerms. Word profiler 606 may then fill modifiedTerms to include one or more words that may be treated similarly to each other by a user device 611. In an embodiment, different terms such as "north van," "n van," and "north Vancouver," may all refer to the same noun, that is, a geolocation named, "North Vancouver." In an embodiment, word profiler 606 may remove extra spaces from such terms and also convert associated text of these terms to lowercase. The dictionary may then be formed by the word profiler 606 with each lower-case term as a "key", along with the first term in the set as "value". The space in between the words may be changed with the symbol "-." For instance, for the term "north van," a modifiedTerm to be included may be given as north-van. For example, the terms "vancouver" and "van" may be set keys, while the term "vancouver" may be set as the value.

In a next step 702, word profiler 606 may create an empty word set. The empty word set may be labeled as stopWords (as defined previously). In an embodiment, project controller 602 may receive one or more stop words from one or more participant devices 611. According to the embodiment, word profiler 606 may then fetch these stop words from project controller 602 and may remove spaces between words as well as convert the text of the stop-words to lower case. Further, if, for example, there is a space between two characters, word profiler 606 may convert the space to "-". Further, word profiler 606 may add the stop-word in the modifiedTerms dictionary, wherein the stop-word, with the space included, may be added as the "key" and the stop-word with the character "-" may be added as the "value."

In a next step 703, word profiler 606 may extend stopWords with stop words from an external library, such as library 613. In an embodiment, library 613 may contain a list of stop-words received from one or more of user devices 611, obtained from a hard-coded set, or otherwise obtained from a user through external sources. Library 613 may communicate with system 600 over network 310, such that system 600 may populate stopWords from the extended list as well as stop-words received directly from user devices 611.

In a next step 704, word profiler 606 may extend stopWords with stop-words from internal library. In an embodiment, internal library may be a library of words internal to system 600, such as library 614. In a next step 705, project controller 602 may receive an input from user device 611. The user input, in one embodiment, may comprise a list of words submitted by user device 611, for example, as thought objects 510. The user inputs may be aggregated (that is, into aggregatedText) as a user-entered list for further processing by project controller 602.

In an embodiment, for each list in a user-entered list, starting at a step 706, steps 707-715 may be performed by one or more components of the system 600 to populate modified terms designated by stopWords. Starting at step 707, project controller 602 may save the first element in the list as convertedFirstElement. In a next step 708, word profiler 606 may remove extra spaces from convertedFirstElement. In a next step 709, word profiler 606 may convert convertedFirstElement to a lower-case word. Further, in a next step 710, word profiler 606 convert any spaces within text contained in the convertedFirstElement to '-'.

Furthermore, beginning at a next step 711, steps 712-715 may be performed by one or more components of system 600 for each element in the list. For instance, in step 712, project controller 602 may save the covertedFirstElement as modifiedElement, after word profiler 606 may process convertedFirstElement by removing spaces and converting it into lower case. In a next step 713, word profiler 606 may remove extra spaces from modifiedElement. In a next step 714, word profiler 606 may convert modifiedElement to lower case.

In a next step 715, project controller 602, may add modifiedElement to a modifiedTerms dictionary, such that the modifiedElement is saved as a key while the convertedFirstElement is saved as a value.

In an embodiment, starting at step 716, system 600 may process the manual stop-words for each element in user-entered list, such as described in steps 717-725, to further populate stopWords. Starting at step 717, project controller 602 may save each element as modifiedElement. In a next step 718, word profiler 606 may remove extra spaces from modifiedElement. In a next step 719, word profiler 606 may convert modifiedElement to lower case. In a next step 720, project controller 602 may determine if modifiedElement contains a space. In case it is determined, by project controller 602 that the modifiedElement does not contain any space characters, project controller may add modifiedElement to stopWords, in a next step 721.

Otherwise, if it is determined by project controller 602 that the modifiedElement contains any space characters, in a next step 722, project controller 602 may save modifiedElement as convertedElement. In a next step 723, word profiler 606 may replace any spaces in convertedElement with '-'. Further, in a next step 724, project controller 602 may add the modifiedElement as key and convertedElement as value, to modifiedTerms dictionary, that is, modifiedTermDict.

Finally, in a next step 725, project controller 602 may add the convertedElement to stopWords.

Figure 8:
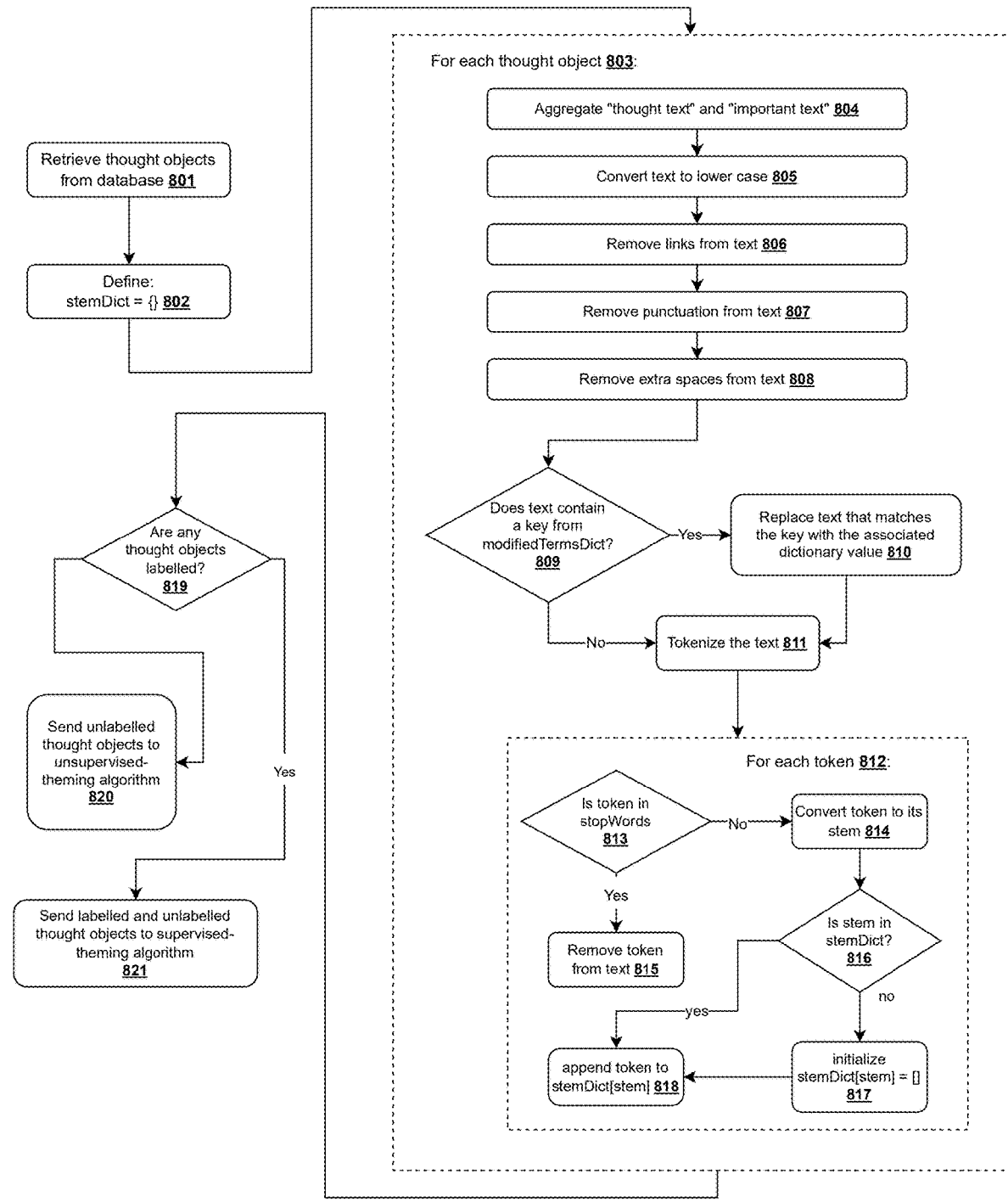
FIG. 8 is a flow diagram illustrating a method for processing thought objects, according to a preferred embodiment of the invention.

FIG. 8 is a flow diagram illustrating a method for processing thought objects 510, according to a preferred embodiment of the invention. According to the embodiment, in a first step 801, project controller 602 may retrieve thought objects 510 from database. In an embodiment, project controller 602 may retrieve thought objects 510 from object database 608 or directly receive thought objects 510 from one or more user devices 611.

In a next step 802, project controller 602 may define stemDictionary such that stemDict={ }. The stemDictionary may contain a stem, which may be a part of a term used in information retrieval indices. Within the stemDictionary, each word may be considered to have a stem (defined, for example, in an .STM file or database table) and one or more possible suffixes (defined, for example, in an .SUF file or database table). For example, for the terms "go" and "going", "go" may be considered as the stem and "ing" as the suffix. Entries in the .STM file may consist of the stem word (go) followed by a blank, and then an index entry in the suffix file (.SUF) shall be "go 1". This index indicates which suffix values are acceptable for an associated stem word.

In an embodiment, for each thought object 510, steps 804-818 may be performed by one or more components of system 600, starting at step 803. In next step 804, text aggregator 604 may aggregate text within thought object 510, that is, thought_summary 513 and/or thought_detail 514. In an embodiment, text aggregator 604 may aggregate thought_summary 513 and thought_detail 514 per thought object 510, both for themed thought objects 510 and other un-themed thought objects 510.

In a next step 805, word profiler 606 may convert the aggregated text to lower case. In a next step 806, word profiler 606 may remove links from the aggregated text. The links, in an embodiment, may be hyperlinks to a webpage and/or links to other text in a document. In a next step 807, word profiler 606 may remove punctuation from the aggregated text. Further, in a next step 808, word profiler 606 may remove extra spaces from the aggregated text.

In a next step 809, project controller 602 may determine whether the aggregated text contains a key from modified-TermsDict. In case it is determined, by project controller 602, that the aggregated text contains a key from modified-TermsDict, in a next step 810, project controller 602 may replace the aggregated text that matches a key with an associated dictionary value.

Otherwise, if it is determined, by project controller 602, that the aggregated text does not contain a key from modifiedTermsDict, or after a replacement of aggregated text by project controller 602 in step 810, in a next step 811, tokenizer 603 may tokenize the aggregated text to generate one or more tokens.

In an embodiment, for each such token created by tokenizer 603, system 600 may perform the steps 813-818 starting at a step 812. In step 813, tokenizer 603 may determine if the generated token is present in stopWords. If it is determined, by tokenizer 603, that the generated token is not present in stopWords, tokenizer 603, in a next step 814, may convert the token to its stem. In an embodiment, stemming may be performed to produce morphological variants of a root or base word. Stemming programs may commonly be referred to as stemming algorithms or stemmers. For instance, a stemming algorithm may reduce the words "chocolates," "chocol" to the root word, "chocolate" and "retrieval," "retrieved," "retrieves" reduce to the stem "retriev," and the like.

In an embodiment, tokenizer 603 may convert one or more tokens to one or more stems using a NLTK stem library, which may be extracted from external library 613 or internal library 614 (for example, from a library for tokenization known in the art).

Referring again to FIG. 8, if it is determined, in step 813, that the token is present in the stopWords, in a next step 815, tokenizer 603 may remove the token from the tokens of the aggregated text. In a next step 816, tokenizer 603 may determine if the stem is present in stemDict. If the stem is not present in stemDict, in a next step 817, tokenizer 603 may initialize a process for stemDict, given by: stemDict [stem]=[ ]. In a next step 818, tokenizer 603 may then append the token to stemDict[stem]. Otherwise, in case it is determined, by tokenizer 603, that the stem is present in stemDict, tokenizer 603 may directly append token to stemDict[stem], in step 818.

Figure 9:
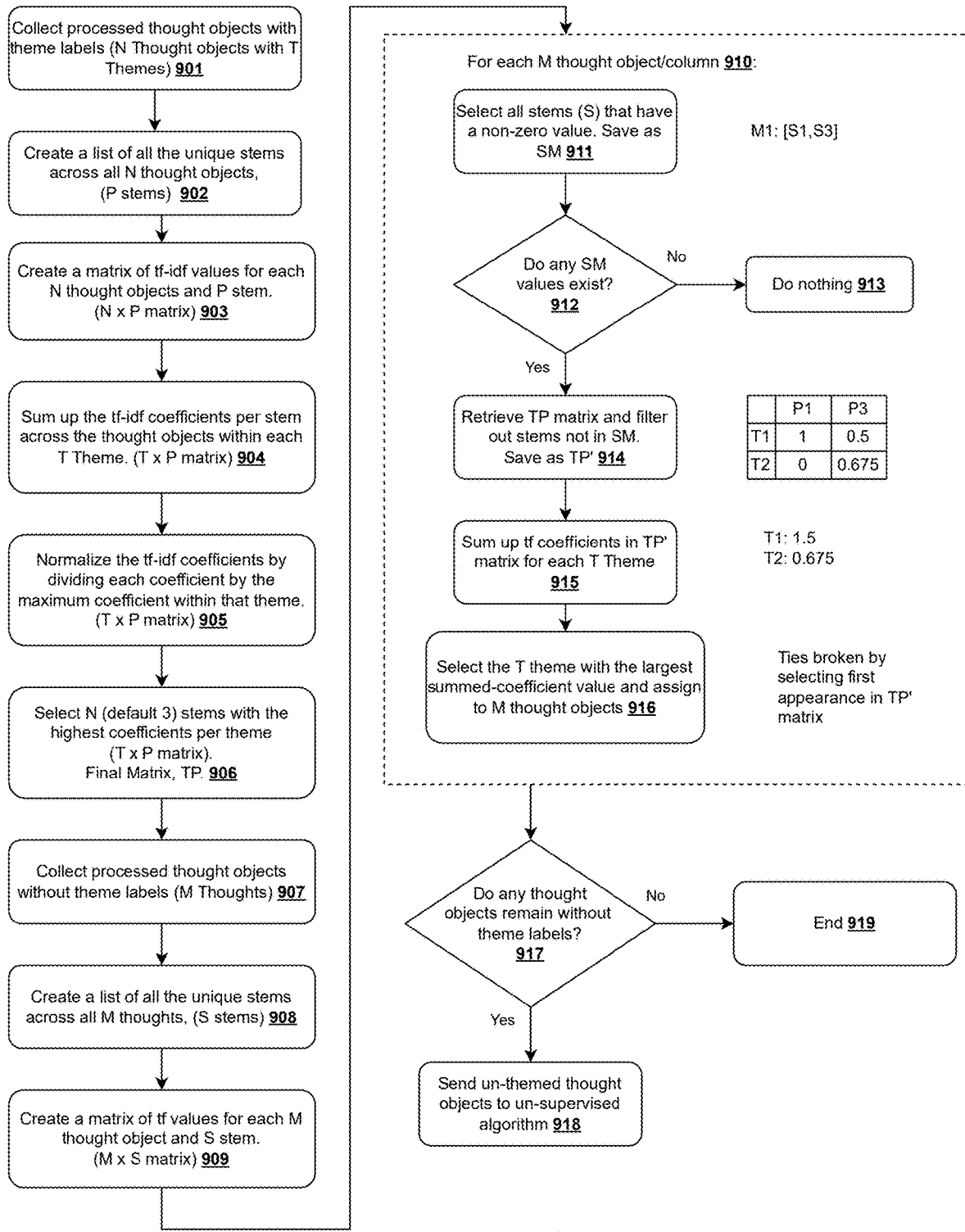
FIG. 9 is a flow diagram illustrating a method for supervised theming, according to a preferred embodiment of the invention.

FIG. 9 is a flow diagram illustrating a method for supervised theming, according to a preferred embodiment of the invention. According to the embodiment, in a first step 901, project controller 602 may collect processed thought objects 510 having associated themes. In an embodiment, object themer 605 may then generate a table of N thought objects 510 that may be associated with T themes. The "N×T" table may identify all thought objects 510, that may be associated with one or more themes, as determined by the stemming process, described in conjunction with FIG. 8.

In a next step 902, object themer 605 may create a list of all unique stems (P stems) across all N thought objects 510. For instance, object themer 605 may parse the N thought objects 510 that may be currently associated with T themes, and extract stems from stemDict for all N thought objects 510, as generated by tokenizer 603.

In a next step 903, project controller 602 may create a matrix of tf-idf values for each of the N thought objects 510 and P stems, to create a "N×P" matrix. A tf-idf value may be a value pertaining to term frequency-inverse document frequency, intended to reflect how important a word is to a document in a collection of corpuses. In an embodiment, the term frequency may be calculated, by project controller 602, using the following exemplary sequence:

tf(w, d)=log (1+f(w, d)), wherein d denotes a given thought from a dataset, w is a given word in a thought, and f(w, d) denotes a frequency of the word w in the thought d. Further, the inverse term frequency may be computed by project controller 602, based on the following exemplary sequence:

$$idf(w, D) = \log\left(\frac{N}{f(w, D)}\right),$$

wherein D denotes a collection of all thoughts. The tf-idf score may be computed by project controller 602 using the following exemplary sequence:

tfidf(w, d, D)=tf(w, d)*idf(w, D). For such a computation, project controller 602 may utilize filtered tokenized stems of themed thought objects, as generated using tokenizer 603, as an input value. This value may be denoted as M vectors of all stemmed tokens. The output value may then be a coefficients matrix, generated by project controller 602, that may denote a cross relation between the M vectors and the number of all stems in the corpus of themed thought objects (S), in an M×S matrix. In some embodiments, each coefficient may represent the tf-idf value per thought object 510, for that particular stem.

In another embodiment, project controller 602 may create the N×P matrix for themed thought objects 510, using, for example, a "Scikit-Learn" or "sklearn" library.

Referring again to FIG. 9, in a next step 904, project controller 602 may calculate a sum of the tf-idf coefficient values per stem P across the thought objects 510 within each of the T themes, to generate a T×P matrix. In a next step 905, project controller 602 may normalize the tf-idf coefficient values by dividing each coefficient value by the maximum coefficient value within that theme T.

In a next step 906, project controller 602 may select n stems P with the highest coefficients per theme within the T×P matrix. In an embodiment, the default number of stems P that may be selected, may be set to 3 by the project controller 602. Based on the selection of the n stems P, a final T×P matrix may be generated by the project controller 602. In a next step 907, project controller 602 may collect processed thought objects 510 M, that may have no associated themes.

In a next step 908, project controller 602 may create a list of all unique stems across all M thought objects. The unique stems may be denoted as S. In a next step 909, project controller 602 may create a matrix of term frequency (tf) values for each of the M thought objects 510 and S stems, thereby creating a M×S matrix.

In an embodiment, one or more components of system 600 may process each of the M thought objects 510 populated in each column of the M×S matrix, starting at step 910. In a next step 911, project controller 602 may select all stems S that have a non-zero value. In an embodiment, the non-zero values may be stored, by project controller 602 in object database 608, as SM. In a next step 912, if the non-zero values SM do not exist, project controller 602 may do nothing at step 913. Otherwise, if the non-zero values exist, in a next step 914, project controller 602 may retrieve the T×P matrix and filter out stems that are not present in SM. Project controller 602 may save such values as a TP' matrix. For instance, stems P1 and P3, with, for example, values 1 and 0.5 for theme T1, respectively, and, for example, values 0 and 0.675, for theme T2, respectively, may be extracted and saved by project controller 602.

In a next step 915, project controller 602 may compute a sum of the tf coefficients in TP' matrix for each of the themes T. Referring again to the above example, the sum for theme T1 would be, for example, 1+0.5=1.5; and the sum for the theme T2 would be, for example, 0+0.675=0.675. In a next step 916, project controller 602 may select the theme T with the largest summed-coefficient value and assign the theme T to each M thought object 510. In the above example, project controller may assign theme T1, with a larger summed-coefficient value as 1.5, to the thought object 510.

In a next step 917, project controller 602 may determine whether any thought objects 510 remain without themes. In case such thought objects 510 remain, in a next step 918, project controller 602 may send such un-themed thought objects 510 to un-supervised algorithm. Otherwise, the method 900 ends at a next step 919.

Figure 10:
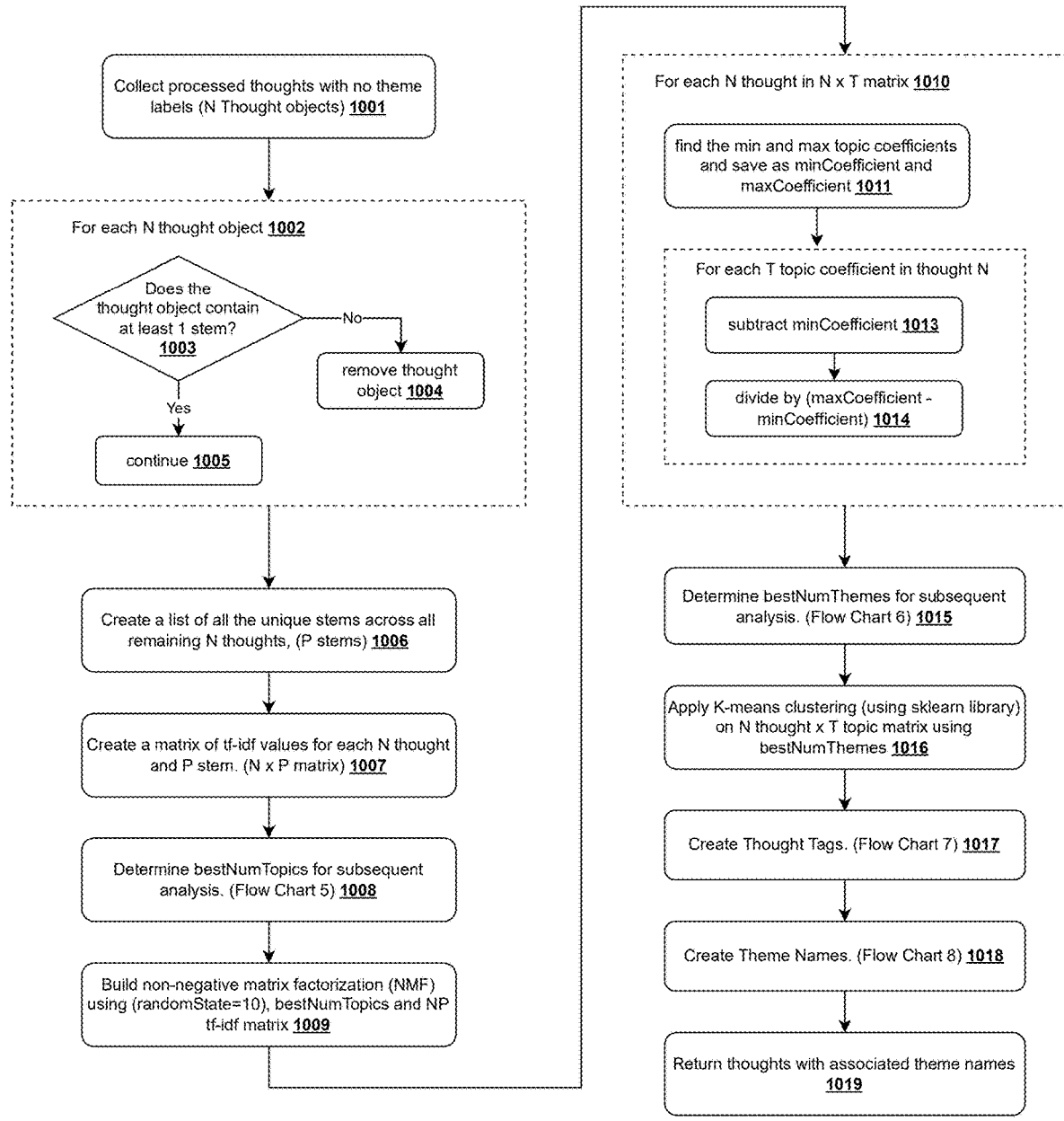
FIG. 10 is a flow diagram illustrating a method for unsupervised theming, according to a preferred embodiment of the invention.

FIG. 10 is a flow diagram illustrating a method for unsupervised theming, according to a preferred embodiment of the invention. According to the embodiment, in a first step 1001, project controller 602 may collect one or more processed thought objects 510 that may have no associated themes (N thought objects). For each N thought object 510, starting at a next step 1002, system 600 may perform steps 1003-1005.

In step 1003, project controller 602 may determine whether a thought object 510 contains at least one stem. In a case where it is determined, by project controller 602, that the thought object 510 does not contain a stem, in a next step 1004, project controller 602 may remove the thought object 510 from processing. Otherwise, in a next step 1005, project controller 602 may continue processing.

In a next step 1006, project controller 602 may create a list of all the unique stems P across all remaining N thought objects 510. In a next step 1007, project controller 602 may then create a matrix of tf-idf values for each such N thought and P stem, creating an N×P matrix.

In a next step 1008, project controller 602 may determine a value for bestNumTopics for subsequent analysis. The subsequent analysis is described herein with reference to FIG. 11. In an embodiment, the value for bestNumTopics may be determined, by project controller 602, by executing a topic modeling approach for a specified range of number of topics. The minimum number of topics and the maximum number of topics, of the range of topics, may be determined by project controller 602 by utilizing a number of thought objects 510, which do not exceed a preconfigured number of topics (e.g., 15 topics). In an embodiment, project controller 602 may run the topic modeling approach three times per number of total such topics.

Further, in a next step 1009, project controller 602 may build a non-negative matrix factorization (NMF) using a randomState value equaling, for example, 10, the value for bestNumTopics and the N×P tf-idf matrix. In an embodiment, the output of the NMF on N×P tf-idf matrix may generate two matrices. i.e., a N×T (thought versus topic matrix) and a T×P (topics versus stems) matrix.

In an embodiment, project controller 602 may perform steps 1011-1014 for each thought object 510 in the N×T matrix, starting at step 1010. In step 1011, project controller 602 may determine minimum and maximum coefficients for a topic. The minimum and maximum coefficients may be saved as minCoefficient and maxCoefficient, by project controller 602, to configuration database 609. Further, for each topic coefficient for topic T, in N thought object 510, at a step 1012, project controller 602, at a next step 1013, may subtract minCoefficient from maxCoefficient to generate value for (maxCoefficient−minCoefficient). Further, minCoefficient may be subtracted from the value of topic coefficient. In a next step 1014, project controller 602 may divide by the resultant value from the earlier computed value of (maxCoefficient−minCoefficient).

In a next step 1015, project controller 602 may determine a value of bestNumThemes for subsequent analysis. The subsequent analysis is further described in conjunction with FIG. 13. In an embodiment, project controller 602 may use K-means clustering and elbow plot to determine the bestNumThemes. For instance, the coefficients of each topic T per thought object 510, for a range of themes related to the number of un-themed thought objects, may be applied. Each normalized topic coefficient per thought object may be taken as input. Further, the minimum and maximum coefficient value to determine the range may be based on a number of thought objects, which may not exceed, for example, 15 themes.

In a next step 1016, project controller 602 may apply k-means clustering (e.g., using the sklearn library) on N thought objects 510 for T topic matrix, i.e., N×T matrix, using the value of bestNumThemes. Further, in a next step 1017, word profiler 606 may create thought tags. The creation of thought tags, by word profiler 606, is described in further detail with reference to FIG. 14A.

In a next step 1018, object themer 605 may create theme names. The creation of theme names is further detailed in FIG. 14B. In a next step 1019, object themer 605 may return thought objects 510 with associated theme names created for the thought objects 510.

Figure 11:
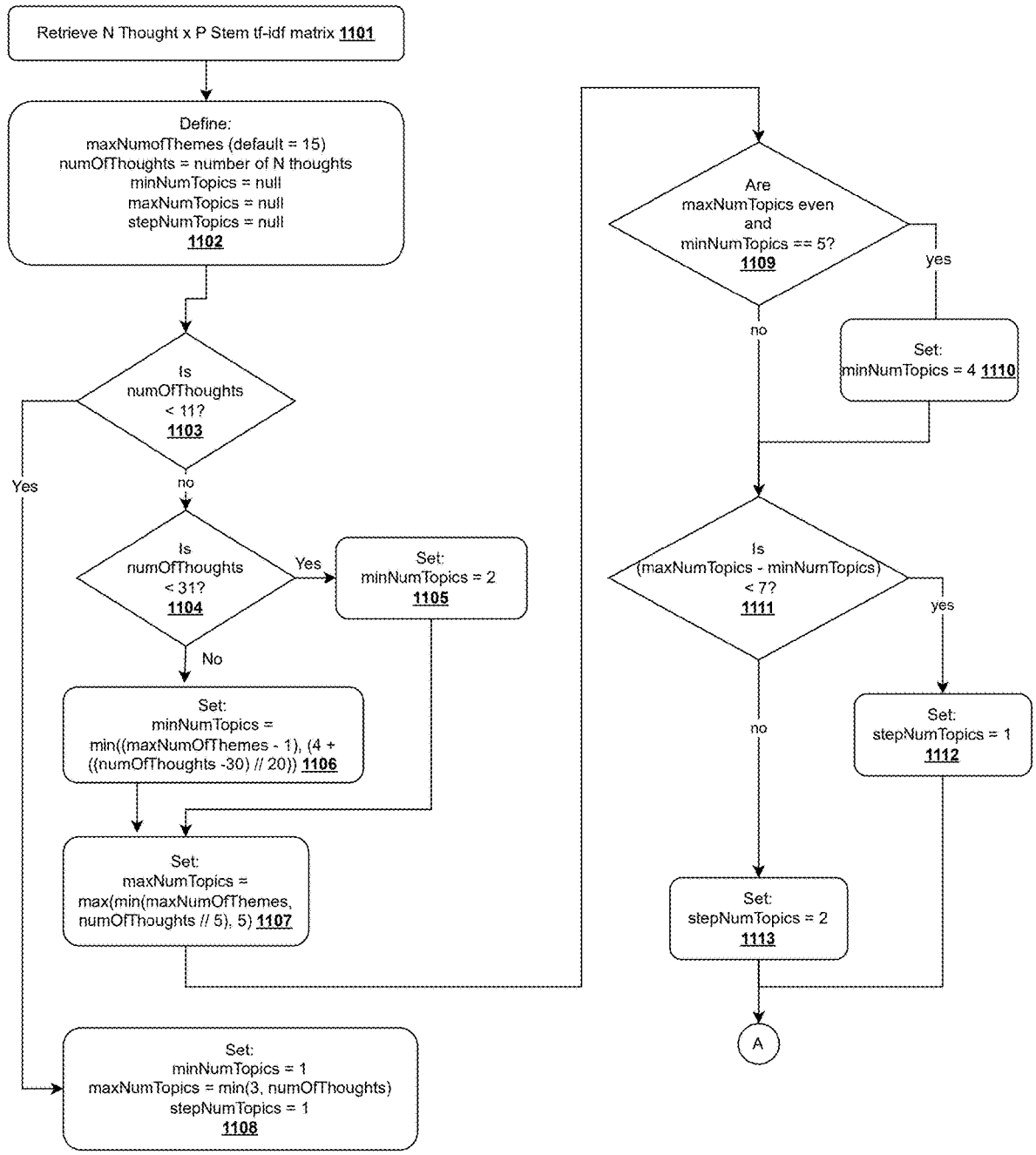
FIG. 11 is a flow diagram illustrating a method for finding a range of topics, according to a preferred embodiment of the invention.

FIG. 11 is a flow diagram illustrating a method for finding a range of topics with a most stable value, according to a preferred embodiment of the invention. According to the embodiment, in a first step 1101, project controller 602 may retrieve the N×P tf-idf matrix. In a next step 1102, object themer 605 may define a maximum number of themes, given by maxNumofThemes. In an embodiment, the default maximum number of themes may be set, for example, at 15. Further, object themer 605 may also define number of thought objects 510 N, given by numOfThoughts, a minimum number of topics, given by minNumTopics, a maximum number of thought objects, given by maxNumTopics, as well as a step number of topics, given by stepNumTopics. In an embodiment, the values for minNumTopics, maxNumTopics, and setNumTopics, may be set to null, by object themer 605.

In a next step 1103, project controller 602 may determine whether the value of numOfThoughts is less than a preconfigured amount, for example, 11. If the value is greater than 11, in a next step 1104, project controller 602 may again determine if value of numOfThoughts is less than a preconfigured amount, for example, 31. If it is determined, by project controller 602, that the value of numOfThoughts is less than 31, in a next step 1105, project controller 602 may set a value of minNumTopics to a preconfigured amount, for example, 2. Otherwise, if it is determined, by project controller 602, that the value of numOfThoughts is not less than 31, in a next step 1106, project controller 602 may set a value of minNumTopics using the following exemplary sequence:

minNumTopics=min((maxNumOfThemes−1), (4+((numOfThoughts−30)//20)). Further, in a next step 1107, project controller may set a value of maxNumTopics by using the following exemplary sequence:

maxNumTopics=max(min(maxNumOfThemes, numOfThoughts//5), 5).

Referring again to step 1103, if it is determined by project controller 602 that value of numOfThoughts is less than 11, in a next step 1108, project controller 602 may set value of minNumTopics as 1, a value of maxNumTopics as 3 or as value of numofThoughts, whichever is lower, and a value of stepNumTopics as 1.

In a next step 1109, project controller 602 may determine whether a value of maxNumTopics is, for example, an even number and a value of minNumTopics equals, for example, 5; if it is determined by project controller 602 that both these conditions are met, in a next step 1110, project controller 602 may set a value of minNumTopics to, for example, 4. Otherwise, in a next step 1111, project controller 602 may further determine whether a difference between the value of maxNumTopics and minNumTopics is less than, for example, 7. If it is determined, by project controller 602, that the difference in the values of maxNumTopics and minNumTopics is less than 7, in a next step 1112, project controller 602 may set a value of stepNumTopics as, for example, 1. Otherwise, in a next step 1113, project controller may set the value of stepNumTopics to, for example, 2. The method may then continue to FIG. 12A.

Figure 12A:
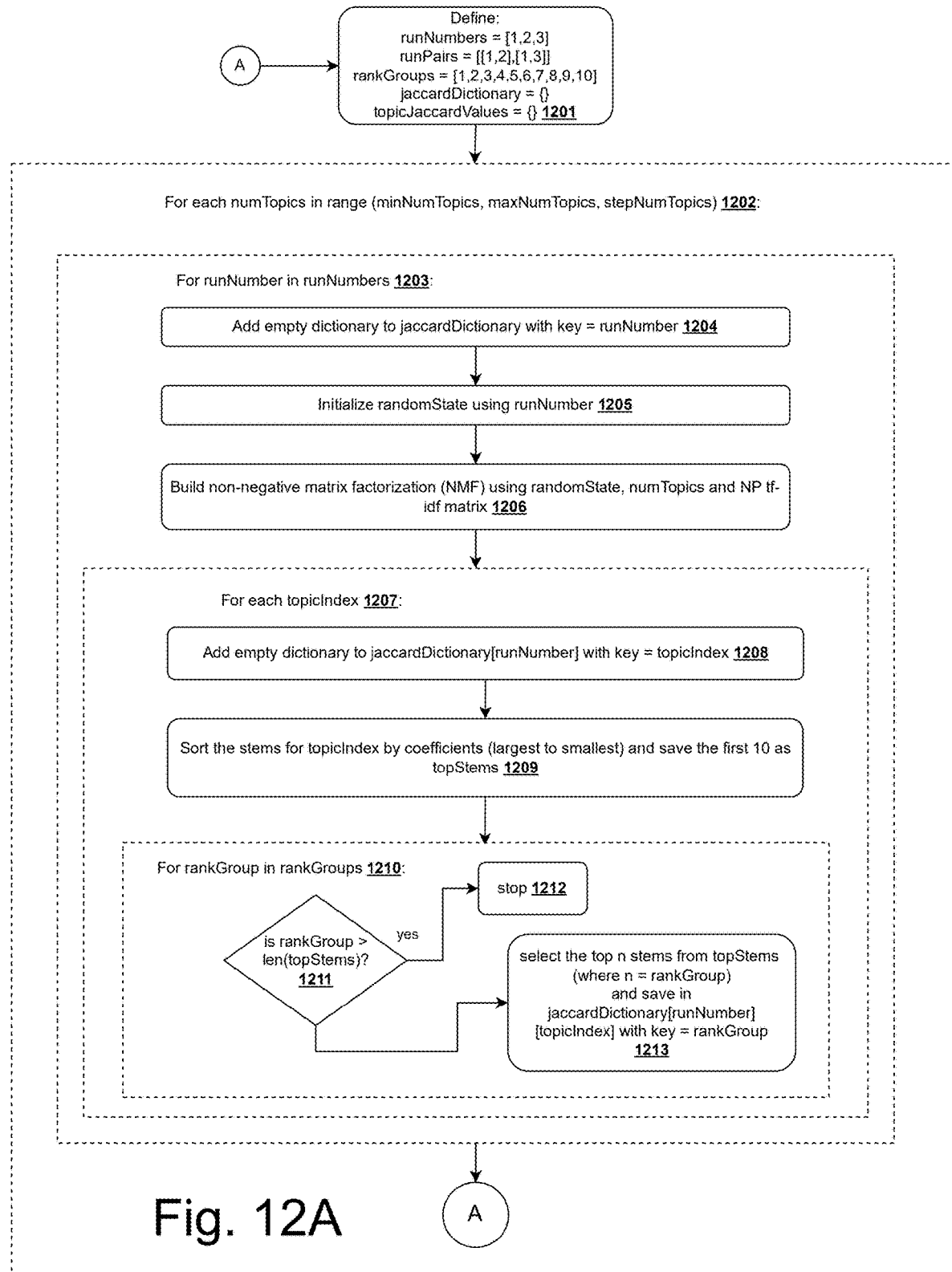
FIG. 12A-12C are flow diagrams illustrating a method for finding a number of topics with the most stable value, according to a preferred embodiment of the invention.
Figure 12B:
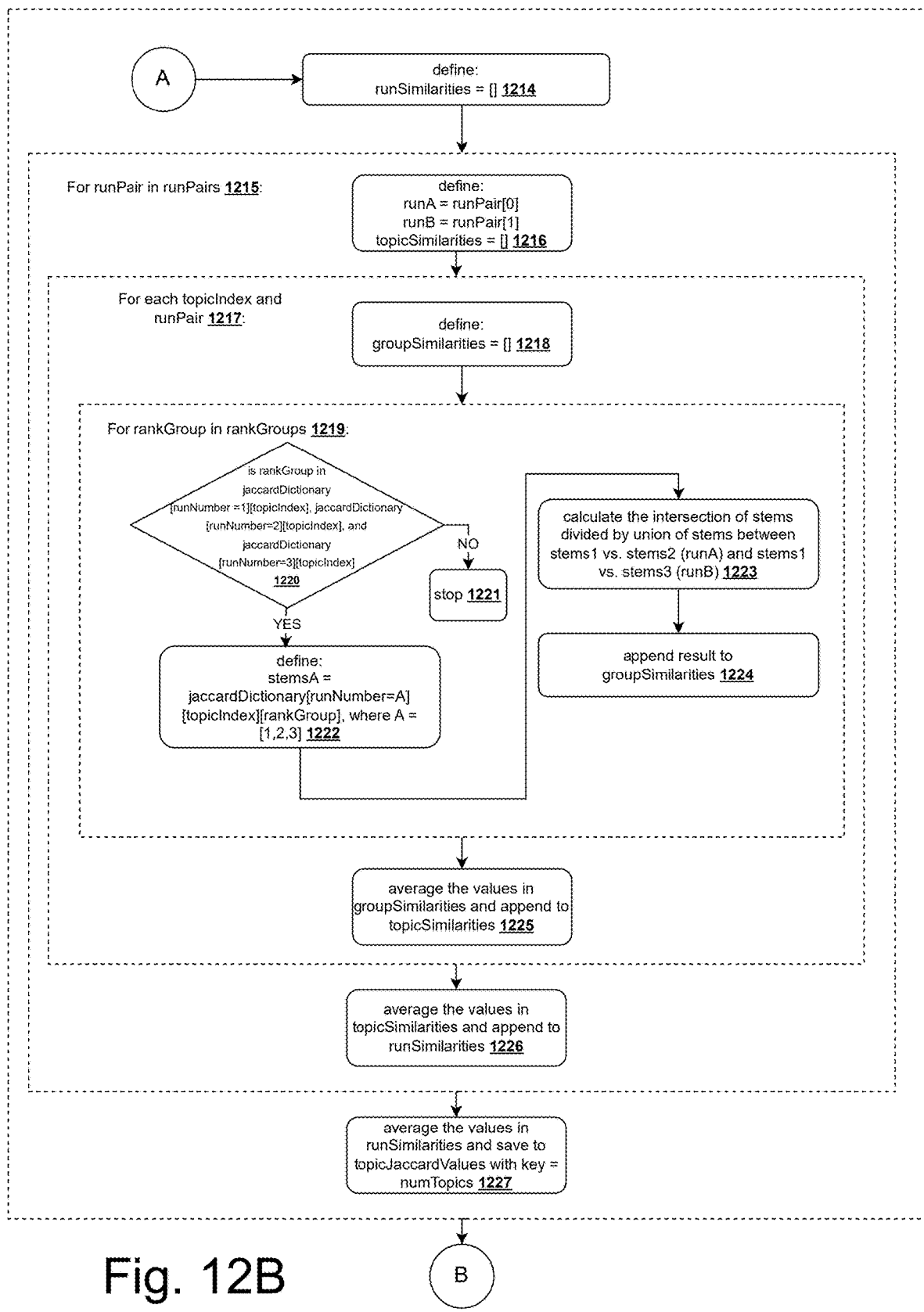
Figure 12C:
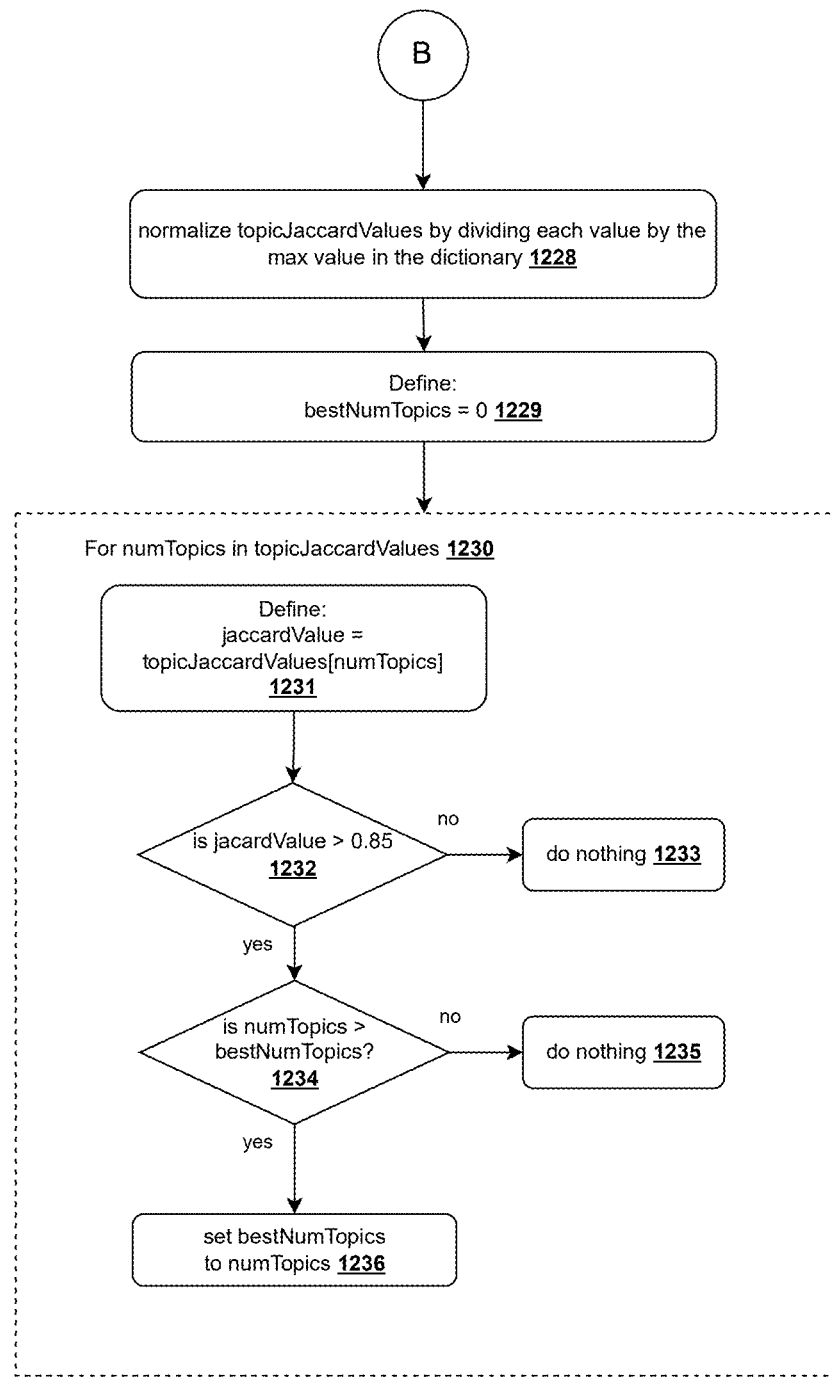

FIG. 12A-12C is flow diagrams illustrating a method for finding a preferred number of topics with a most stable value, according to a preferred embodiment of the invention. According to the embodiment, in a first step 1201 (referring to FIG. 12A), project controller 602 may define the following values: runNumbers=[1,2,3]; runPairs=[[1, 2], [1, 3]]; rankGroups=[1, 2, 3, 4, 5, 6, 7, 8, 9, 10]; jaccardDictionary={ }; and topicJaccardValues={ }. In an embodiment, the runNumbers may be a number of times that a Jaccard algorithm may be run to determine one or more number of topics comprising the most stable stems. The Jaccard index, is a statistic used to determine how similar and/or diverse a sample set is. A Jaccard coefficient may measure similarity between finite set and may be defined as the size of the intersection over the size of the union of sample sets. Further, runPairs may be pairing of sample sets of topics, for which the Jaccard algorithm may be run together by project controller 602. Furthermore, the value of rankGroups may be defined based on, for example, a top 10 ranked stems per topic. A Jaccard dictionary may be initiated by project controller 602, and values for topics, given by topicJaccardvalues may be set.

In a next step 1202, for each value of numTopics in a range given by values of minNumTopics, maxNumTopics, and stepNumTopics, steps 1203-1227 may be performed by one or more components of system 600.

Starting with step 1203, for each runNumber in the runNumbers list, project controller 602, in a next step 1204, may add an empty dictionary to jaccardDictionary with having a key set to the runNumber. In a next step 1205, project controller 602 may initialize a randomState using runNumber. In an embodiment, the scikit-learn library (sk-learn library) may use random permutations for generating random numbers drawn from a variety of probability distributions. The random state provided may be used as a seed to a random number generator such that random numbers may be generated in the same order when running the Jaccard algorithm.

In a next step 1206, project controller 602 may build a non-negative matrix factorization (NMF), using values for randomState, numTopics and the N×P matrix. Further, in a next step 1207, for each value of topicIndex, project controller 602, starting at step 1208, may add an empty dictionary to the jaccardDictionary[runNumber] having value of key as the value of topicIndex. In a next step 1209, project controller 602 may sort the stems for topicIndex by the value of their coefficients (e.g., largest to smallest). Project controller 602 may then save the first, for example, 10 stems in a group given by topStems, within the configuration database 609.

Further, in a next step 1210, for each rankGroup in rankGroups, project controller 602 may perform steps 1211-1213. In step 1211, project controller 602 may determine whether the value of rankGroup is greater than the length of topStems as given by len(topStems). If it is determined, by project controller 602, that the value of rankGroup is greater than the len(topStems), the method stops at step 1212. Otherwise, in a next step 1213, project controller 602 may select the top n stems from topStems, wherein n may be the value rankGroup. Further, project controller 602 may save the value of topicIndex having value of the key as value of rankGroup, in the jaccardDictionary[runNumber]. The method may then continue to FIG. 12B.

FIG. 12B continues processing at step 1214, wherein project controller 602 may define: runSimilarities=[ ]. In a next step 1215, for each runPair in runPairs, project controller 602, at a step 1216, may define: runA as runPair[0]; runB as runPair[1]; and topicSimilarities=[ ]. In a next step 1217, for each topicIndex and runPair, project controller 602 may define groupSimilarities=[ ], at step 1218. In a next step 1219, for each rankGroup in the rankGroups, project controller 602 may determine, in step 1220, whether a rankGroup is found in JaccardDictionary [runNumber=1][topicIndex] and
jaccardDictionary[runNumber=2][topicIndex] and;
jaccardDictionary[runNumber=3][topicIndex]. If the rankGroup is not found, the method may stop at a next step 1221. Otherwise, in a next step 1222, project controller 602 may define:
stemsA as jaccardDictionary[runNumber=A][topicIndex][rankGroup], wherein A may be 1, 2, and 3. That is, project controller 602 may define stems1=
jaccardDictionary[runNumber=1][topicIndex][rankGroup]; stems2=
jaccardDictionary[runNumber=2][topicIndex][rankGroup]; and stems3=
jaccardDictionary[runNumber=3][topicIndex][rankGroup].

In a next step 1223, project controller 602 may calculate an intersection of stems divided by union of stems between stems1 and stems2, for runA, as well as between stems1 and stems3, for runB. Further, in a next step 1224, project controller 602 may append the result of intersection divided by union of stems to groupSimilarities. In a next step 1225, project controller 602 may compute an average of the values in groupSimilarities and append the average value to the value of topicSimilarities. Further, in a next step 1226, project controller 602 may calculate an average value of the values in topicSimilarities and append the average value to runSimilarities. Furthermore, in a next step 1227, project controller 602 may compute an average value of the values in runSimilarities and save the average value to topicJaccardValues with key as numTopics. The method may then move to FIG. 12C.

FIG. 12C continues processing at step 1228, wherein project controller 602 may normalize topicJaccardValues by dividing each such value by the maximum value in the jaccardDictionary. In a next step 1229, project controller 602 may define a value of bestNumTopics set to 0. Further, in a next step 1230, for each value of numTopics in topicJaccardValues, project controller 602 may perform steps 1231-1236.

In step 1231, project controller 602 may first define a jaccardValue and extract the value from function topicJaccardValues[numTopics]. In a next step 1232, project controller 602 may determine if jacardValue is greater than 0.85. If it is determined, by project controller 602, that the jaccardValue is not greater than 0.85, no further step may be performed by project controller 602, as shown in step 1233. Otherwise, in a next step 1234, project controller 602 may further determine if the value of numTopics is greater than the value of bestNumTopics. If it is determined, by project controller 602, that the value of numTopics is not greater than the value of bestNumTopics, no further step may be performed by project controller 602, as shown in step 1235. Otherwise, in a next step 1236, project controller 602 may set value of bestNumTopics to value of numTopics.

Figure 13:
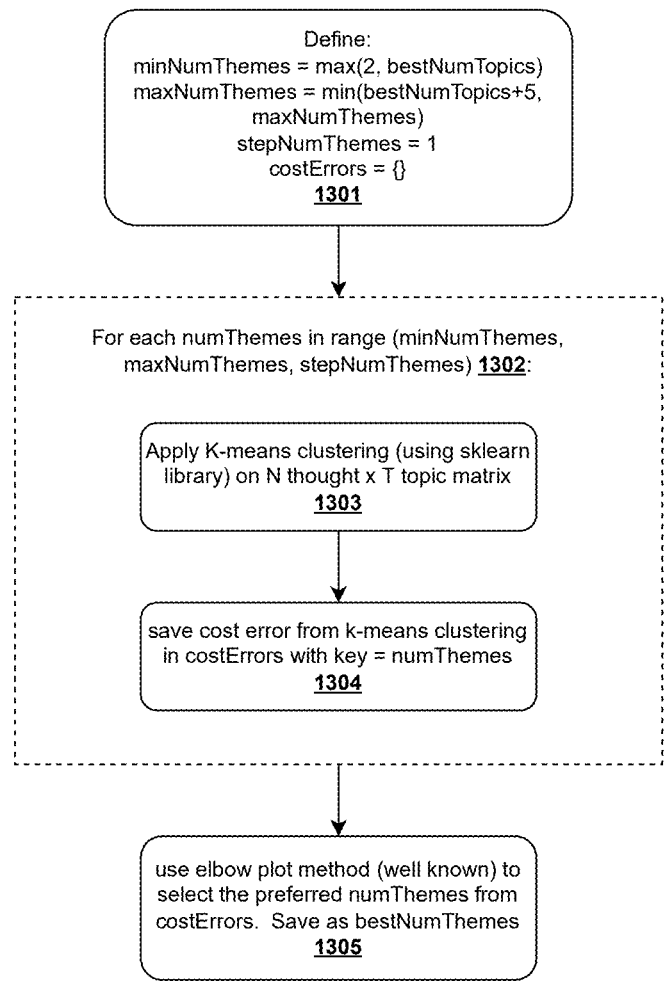
FIG. 13 is a flow diagram illustrating a method for finding the preferred number of themes, according to a preferred embodiment of the invention.

FIG. 13 is a flow diagram illustrating a method for finding the preferred number of themes, according to a preferred embodiment of the invention. According to the embodiment, in a first step 1301, project controller 602 may execute a function for minNumThemes as given by the following exemplary sequence:

minNumThemes=max(2, bestNumTopics).

Further, project controller 602 may define a function for maxNumThemes given by the following exemplary sequence:

maxNumThemes=min(bestNumTopics+5, maxNumThemes).

Furthermore, project controller 602 may also set a value for stepNumThemes given as, for example, 1 and define a costErrors as { }.

Starting step 1302, for each numThemes in a range given by: (minNumThemes, maxNumThemes, stepNumThemes), project controller 602 may perform steps 1303 and 1304. In step 1303, project controller may apply k-means clustering (using a sklearn library) on the N×T matrix where the desired number of clusters is equal to the numThemes value from the present iteration. Further, in a next step 1304, project controller 602 may save value of cost error, determined from the applied clustering, to the costErrors whilst setting value of the key equal to the value of numThemes.

In a next step 1305, project controller 602 may operate an elbow plot algorithm in order to select a preferred value for numThemes from the values of costErrors. This preferred value of numThemes may be saved as the bestNumThemes, by project controller 602. In one or more embodiments, project controller 602 may determine the preferred number of themes by using k-means clustering and elbow plot by applying coefficients of each topic per thought object 510 for a range of themes related to the number of un-themed thought objects 510. K-means clustering may be performed using a library, such as the sklearn library comprising, in some embodiments, a custom elbow plot. In an embodiment, project controller 602 may use the topic coefficient per thought object 510, as an input to the algorithm and minimum, step and maximum values in the range are determined by the number of thought objects (not exceeding, for example, 15 themes).

Figure 14A:
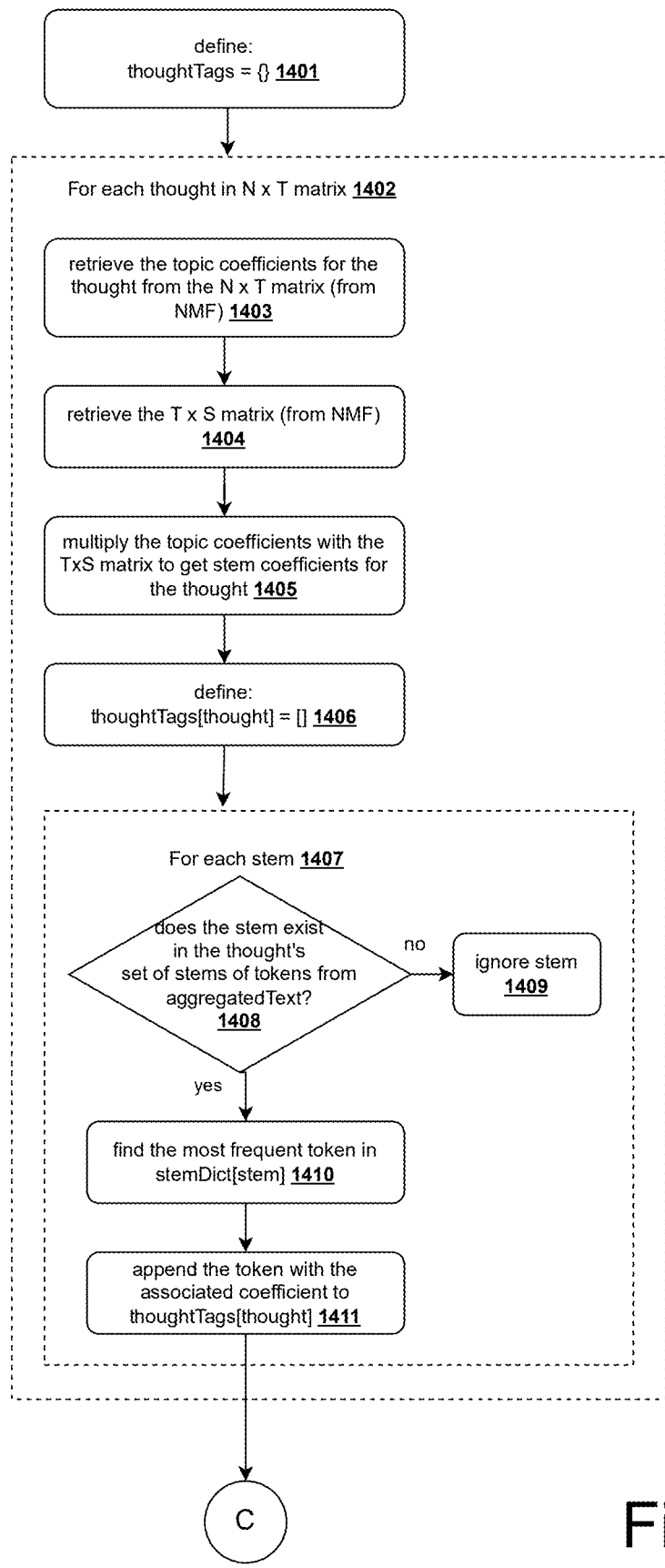
FIG. 14A-14C are flow diagrams illustrating a method for creating themes and respective theme names, according to a preferred embodiment of the invention.
Figure 14B:
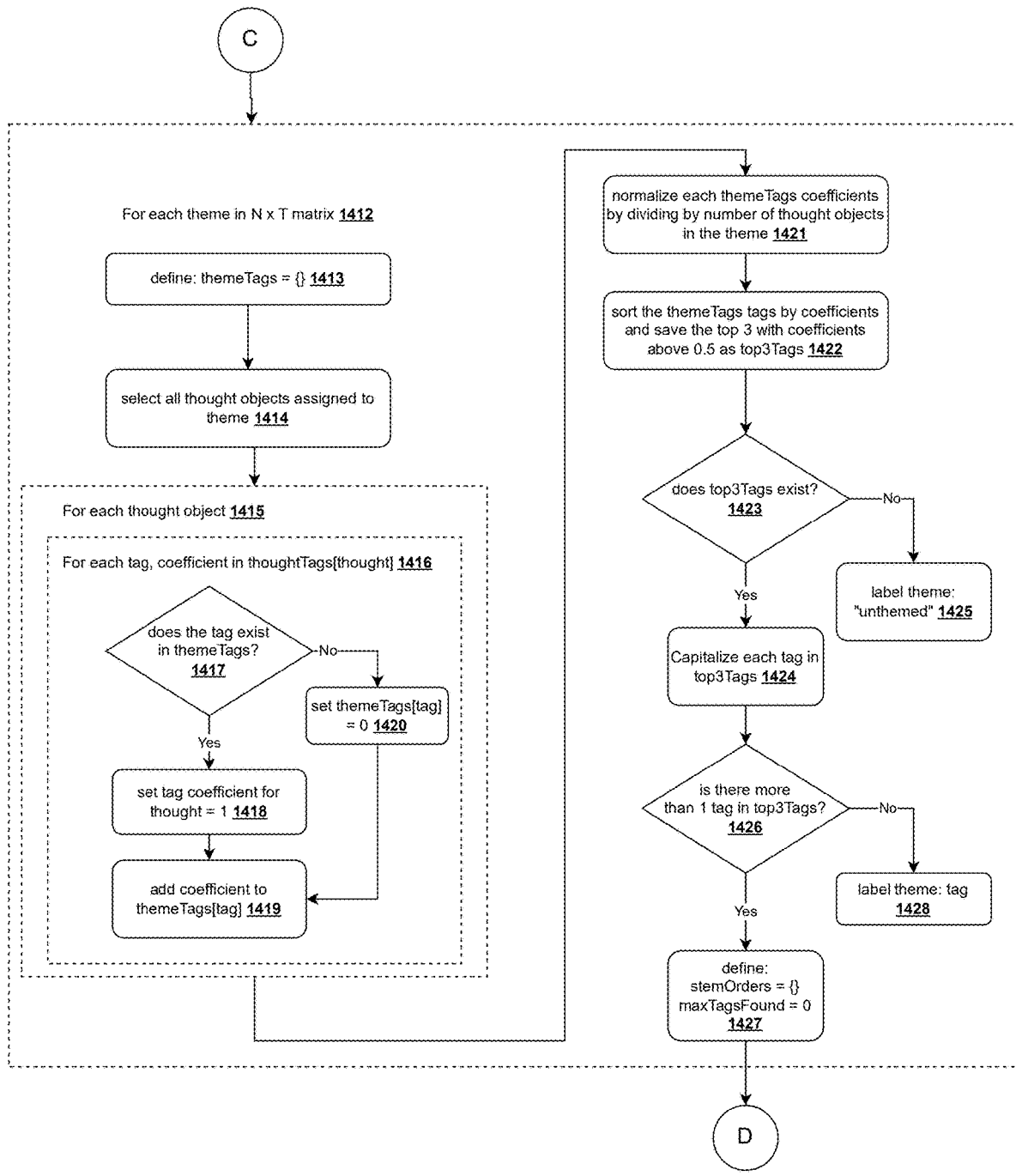
Figure 14C:
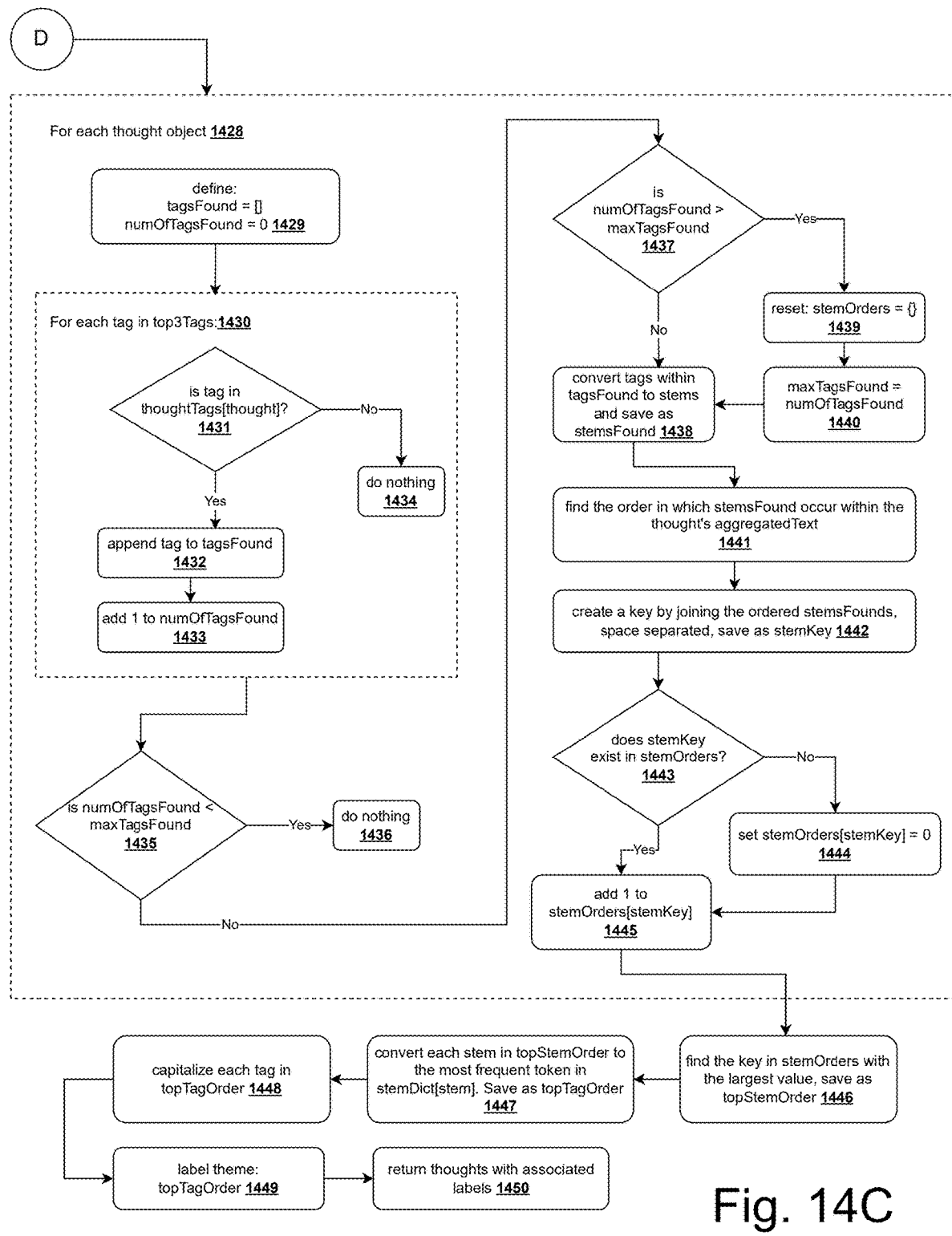

FIG. 14A-14C is a flow diagram illustrating a method for creating theme names, according to a preferred embodiment of the invention. According to the embodiment, in a first step 1401 (referring to FIG. 14A), project controller 602 may define a function for tags associated to thought objects 510, given by thoughtTags and set it initially to { }, that is, an empty dictionary. In a next step 1402, one or more components of system 600, for each thought object 510 in the N×T matrix, perform steps 1403-1411 of the method.

In step 1403, object themer 605 may retrieve topic coefficients for a thought object 510 from the N×T matrix using the non-negative matrix factorization (NMF). Further, in a next step 1404, object themer 605 may retrieve the T×S matrix, again using the Non-negative Matrix Factorization (NMF). In a next step 1405, project controller 602 may generate stem coefficients for the thought object 510. In an embodiment, the stem coefficients may be generated by multiplying the values of topic coefficients with values from the T×S matrix.

In a next step 1406, project controller 602 may define a function given by thoughtTags[thought] and set it to [ ], that is, an initialization of an empty list for a specific thought object 510, within the loop. In a next step 1407, one or more components of system 600 may perform steps 1408-1411 of the method, for each stem.

In step 1408, project controller 602 may determine whether the stem exists in the set of stems of tokens from aggregatedText, for the thought object 510. If the stem does not exist in the set of stems, in a next step 1409, project controller 602 may disregard the stem from processing. Otherwise, in a next step 1410, project controller 602 may determine the most frequent token in the stem dictionary function given by stemDict[stem]. Further, in a next step 1411, tokenizer 603 may append the token with the associated coefficient to the function thoughtTags[thought]. The method may then continue to step 1412 of FIG. 14B.

FIG. 14B, continues processing at step 1412, for each theme in the N×T matrix, one or more components of system 600 may perform the steps 1413-1427 of the method 1400. In step 1413, project controller 602 may define a function themeTags and set it to { }. In a next step 1414, object themer 605 may select all thought objects 510 assigned to a selected theme. Starting from a next step 1415, for each thought object 510, project controller 602 may perform steps 1416-1419 of method. In step 1416, for each tag coefficient in thoughtTags[thought], project controller 602 may perform steps 1417-1420 of method. In step 1417, project controller 602 may determine whether the tag exists in themeTags? If the tag exists, project controller 602 may set the tag coefficient for associated thought object 510 as 1. In a next step 1419, project controller 602 may then add the tag coefficient to themeTags[tag]. Otherwise, if the tag does not exist in the themeTags, in a next step 1420, project controller may set themeTags[tag]=0.

In a next step 1421, object themer 605 may normalize each coefficient saved in themeTags by dividing by the number of thought objects 510 in that theme. Further, in a next step 1422, object themer 605 may sort the themeTags tags by values of the coefficients and save the top 3 coefficients having a value greater than, for example, 0.5, as top3Tags.

In a next step 1423, project controller 602 may determine whether at least one of top3Tags exists in the themeTags. If the top3Tags exist, in a next step 1424, project controller 602 may capitalize each tag in top3Tags. Otherwise, in a next step 1425, project controller may label the theme as "unthemed." Further, in a next step 1426, project controller 602 may further determine if there are more than one tags saved as the top3Tags. If there are more than one tags, in a next step 1427, project controller 602 may define a function stemOrders and set it to { }. Further, project controller may also define a function maxTagsFound and set it to, for example, 0. Otherwise, in a next step 1428, project controller 602 may label theme using a single tag variable present in top3Tags. The method may then continue to FIG. 14C.

Referring to FIG. 14C, in step 1428, for each thought object 510, one or more components of system 600 may perform the steps 1429-1445 of the method.

In step 1429, project controller 602 may define function tagsFound and set it to [ ]; and a function numOfTagsFound and set it to, for example, 0. In step 1430, for each tag in top3Tags, project controller 602 may perform steps 1431-1433 of the method. In step 1431, project controller 602 may determine whether each tag the top3Tags is present in thoughtTags[thought]. If it is determined, by project controller 602, that each tag is present in thoughtTags[thought], in a next step 1432, project controller 602 may append tag to tagsFound. In a next step 1433, project controller 602 may add, for example, 1 to numOfTagsFound. Otherwise, if each tag is not present in thoughtTags[thought], in a next step 1434, project controller 602 may perform no further function.

In a next step 1435, project controller 602 may determine whether a value of numOfTagsFound is less than a value of maxTagsFound. If the value of numOfTagsFound is less than a value of maxTagsFound, in a next step 1436, project controller 602 may perform no function. Otherwise, in a next step 1437, project controller 602 may determine if the value of numOfTagsFound is greater than the value of maxTagsFound. If the value of numOfTagsFound is not greater than the value of maxTagsFound, in a next step 1438, project controller 602 may convert tags within tagsFound to stems and save to a response database 607 (for example as variable, "stemsFound.") Otherwise, in a next step 1439, project controller may reset function stemOrders to { }.

Further, in a next step 1440, if the value of maxTagsFound is equal to the value of numOfTagsFound, project controller 602 may return to step 1438 (see above). In a next step 1441, project controller 602 may find an order in which stemsFound occur within the aggregatedText of the thought object 510. In a next step 1442, project controller 602 may create a key by joining the ordered stemsFounds, separated by spaces, and save the key as stemKey.

In an embodiment, in a next step 1443, project controller 602 may determine whether the stemKey exists in stemOrders function. If the stemKey exists, in a next step 1444, project controller 602 may set function stemOrders [stemKey] as, for example, 0. Otherwise, in a next step 1445, project controller may add, for example, 1 to function stemOrders[stemKey]. Further, in a next step 1446, project controller 602 may find the key in stemOrders, having the largest value, and save the key as topStemOrder.

In a next step 1447, project controller 602 may convert each stem in topStemOrder to the most frequent token in stemDict[stem]. Project controller 602 may save such stems as topTagOrder. Further, in a next step 1448, project controller 602 may capitalize each tag in topTagOrder. In a next step 1449, project controller 602 may label theme as topTagOrder. Further, in a next step 1450, project controller 602 may return thought objects 510 with their associated themes. In a preferred embodiment, thought objects with associated themes are displayed on a graphical user interface.

Figure 15:
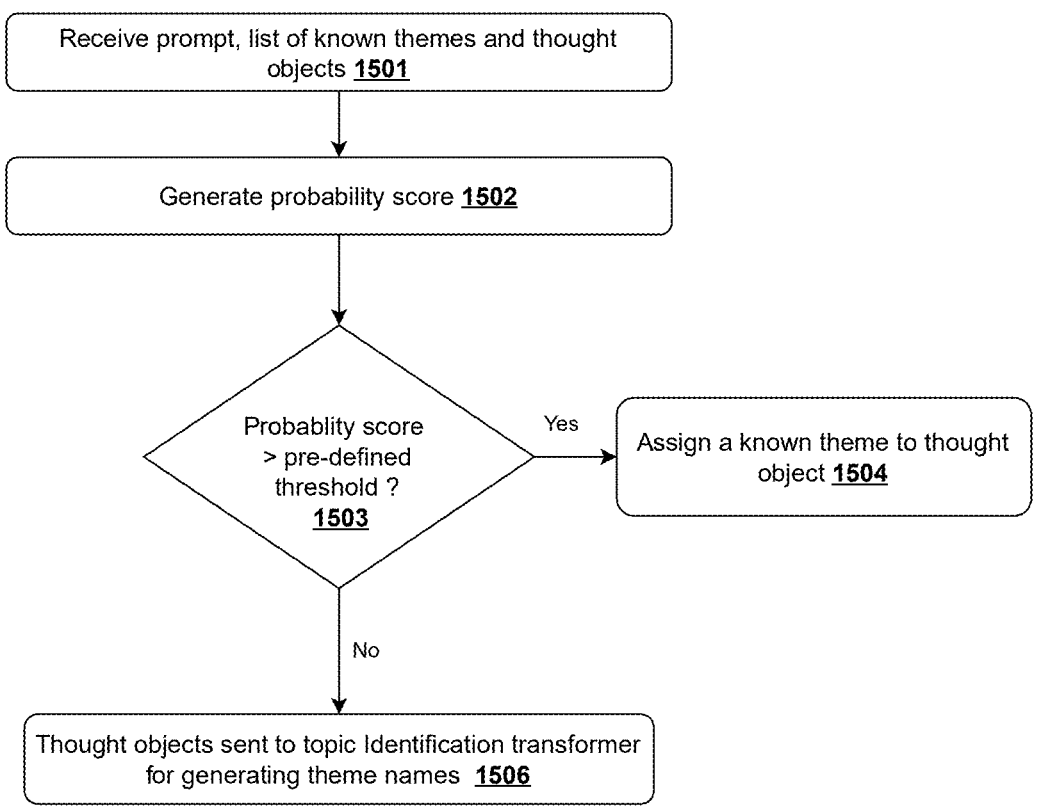
FIG. 15 is a flow diagram illustrating a method for theming of unthemed thought objects, according to an embodiment of the invention.

FIG. 15 is a flow diagram illustrating a method for theming unthemed thought objects, according to an embodiment of the invention. In an embodiment, the supervised theming of unthemed thought objects is performed using theming transformer 620. In an embodiment, theming transformer 620 may be transformer model 640 that has been fine-tuned (trained) using datasets that exhibit a desired characteristic or style.

In an embodiment, fine-tuned theming transformer 620 gets adapted to generate text that aligns with the patterns and properties present in the input data (e.g., survey data, though object exchanges, and/or other communications in a communication environment). Fine-tuning the theming transformer 620 on a labeled dataset of survey responses can improve its ability to identify themes and topics specific to the domain or context. Theming transformer 620 may require multiple datasets for training to perform theming for different domains. Fine-tuned theming transformer 620 may be highly effective in various natural language processing tasks, achieving state-of-the-art performance when sufficient labeled data is available.

At step 1501, theming transformer 620 may receive a prompt, sampled thought objects, and a list of themes 646. The prompt is similar to the structured prompt 647 described in FIG. 6D. The prompt is designed to provide context data, format requirements, and instructions for theme assignment.

In an embodiment, theming transformer 620 processes unthemed thought objects in defined batches to optimize processing efficiency and output quality while maintaining compliance with any transformer token limits that may exist. Rather than processing all unthemed thought objects simultaneously, which could potentially overwhelm the transformer's capacity, reduce efficiency, and/or reduce output quality, the system may process the thought objects in smaller batches (for example, batches of 10 thought objects).

For instance, if there are 100 unthemed thought objects, the system would make 10 separate calls to the theming transformer, with each call processing a batch of 10 thought objects against the list of predefined themes. This batched approach ensures that every unthemed thought object is evaluated against the predefined themes while maintaining high-quality theme assignments and operating, for example, within the transformer's token limitations, and/or provide a more efficient processing.

In an exemplary embodiment, when processing each batch, theming transformer 620 may receive:

The current batch of unthemed thought objects 645.
The complete list of themes 646.
A prompt 647 designed to provide context data, format requirements, and instructions for theme assignment.

This batch processing continues until all unthemed thought objects have been evaluated against the predefined themes. Those thought objects that cannot be confidently themed within a batch (i.e., do not meet the probability threshold) may be subsequently processed by the topic identification transformer 625 for new theme generation.

In an embodiment, the unthemed objects may include data (text responses) collected in a communication exchange between user devices. In an embodiment, thought objects may include data such as text present in a review, survey data, emails, Instant messaging (IM), discussion forums, and/or text from any other communication environment. In an embodiment, a thought object comprises a qualitative response. Qualitative response may be an open-ended, comment-style response, where the participant has the freedom to textualize associated ideas and is not constrained by pre-determined answers. Accordingly, eliciting qualitative responses may have substantial benefits over quantitative responses in that qualitative responses can provide more detailed information on participant interests, consisting of areas of alignment, sentiment, or topics, to name a few.

In addition to thought objects originating from communication exchanges, the present invention also encompasses thought objects corresponding to survey responses provided by users. Surveys are a structured method of gathering information from a targeted group of respondents, often used to gain insights into opinions, preferences, experiences, or behaviors. In the context of the present invention, survey responses can serve as a valuable source of thought objects, offering a diverse range of perspectives and ideas on specific topics of interest.

When applying the concept of thought objects to survey responses, each response to an open-ended (or structured), survey question can be considered a thought object. These responses captured vis a user device comprise qualitative feedback, opinions, and insights associated with a user of the user device. By treating survey responses as thought objects, the same techniques and processes described herein may be applied to analyze, filter, and select diverse and representative responses from a larger pool of survey data.

For example, consider a customer satisfaction survey that includes an open-ended question asking respondents to describe their experience with a particular product or service. Each response to this question may constitute a thought object, encapsulating a user's unique perspective and feedback. These thought objects can then be processed using the methods described herein, such as embedding generation, similarity comparison, and diverse selection using transformers, to identify a subset of responses that represent a wide range of sentiments, experiences, and insights shared by the users.

Applying theming to responses offers several benefits. It may allow organizations to efficiently process and derive meaningful insights from large volumes of qualitative data, which would not be possible to analyze manually. By selecting a diverse set of representative responses, decision-makers can gain a comprehensive understanding of a range of opinions, issues, and suggestions expressed by the respondents. This information can then be used for practical purposes, for example, to inform product improvements, service enhancements, or other strategic decisions based on the voice of a plurality of users.

In an embodiment, a prompt provided to theming transformer 620 may compute instructions such as: see PROMPT_ASSIGNMENT described earlier.

In an embodiment, theming transformer 620 may be used for performing theming on data that is similar to the trained dataset.

In an embodiment, a prompt may include instructions that can guide theming transformer 620 to perform tasks related to supervised object theming. Computed (or in some embodiments, predefined) prompts may help in structuring input and providing clear instructions to the transformer. They can be used to specify the desired format, style, tone, or content of the generated text. Prompts can guide the transformer to perform specific tasks, such as answering questions, generating stories, or producing text with certain characteristics. Prompts help in structuring the input and providing clear instructions to the transformer.

Theming transformer 620 may be provided with a specific topic so that topics relevant to the specific topic are identified. Prompts can be tailored to a specific domain to generate text that aligns with the terminology, style, and conventions of that domain. For example, based on the title of the survey topic themes that align with the terminology, style, and conventions of that domain may be used by the theming transformer 620.

At step 1502, theming transformer 620 generates probability scores. Text in thought objects are analyzed and relevance to a topic is evaluated. A probability score is computed for the topic-text pairs.

At step 1503, theming transformer 620 determines whether a probability score is greater than a pre-defined threshold, wherein the probability score is indicative of the thought object mapping to a known theme. Theming transformer 620 may store multiple lists of themes associated with respective domains. When the thought matches a known theme, then at step 1504, a theme is assigned to the thought object.

At step 1503, when the probability score is not greater than the pre-defined threshold, the thought object does not map to any theme in the list of themes 646, then at step 1506, the thought objects (unthemed thought objects) are sent to topic identification transformer 625 for generating new theme names.

FIG. 16 is a flow diagram illustrating a method for theming thought objects, according to an embodiment of the invention. In an embodiment, theming of unthemed thought objects may be performed through topic identification transformer 625. In an embodiment, topic identification transformer 625 may be a decoder transformer 640 or an encoder-decoder transformer 650.

In general, transformers need to be trained on vast amounts of text data, and the quality and diversity of this data play a crucial role in the model's performance and generalization abilities. During operation when a large number of thought objects are received, proper sampling of data is essential in situations where there may be a limit in number of tokens for the input in transformer, in this respect, input of all thought objects may not be possible. In other aspects, a limit on tokens may be considered proactively in order to increase efficiency of the process. In some respects, since the engagements are relatively cohesive around a posed question, by choosing a specific sampling, very similar topics are identified with respect to the entire number of thought objects as the input.

Unsupervised theming of thought objects may apply to various types of data, including survey responses, reviews, emails, instant messages, and electronic discussions in a communication environment. Advantageously, it is particularly useful for analyzing qualitative, open-ended responses. The topic identification transformer 625 enables the identification of themes, sentiments, and insights from user-communicated content.

In an embodiment, a random sampling may be used. Each data point in the population has an equal probability of being selected. Samples are chosen randomly without any bias. SRS may be suitable when the population is homogeneous and well-defined. In another embodiment, semantic diverse sampling may be performed. Semantic diversity refers to the range of different meanings, concepts, and topics represented in the received thought objects. Semantic diverse sampling involves sampling data that covers a wide spectrum of semantic categories, such as different genres, domains, writing styles, and subject matters. Semantic diversity helps the topic identification transformer 625 learn a comprehensive understanding of language and its various use cases.

At step 1602, topic identification transformer 625 may receive a prompt and plurality of thought objects for theming. In an embodiment, the received plurality of thought objects are sampled though objects generated by theming computer 600A either Simple Random Sampling (SRS) or stratified sampling.

The prompt is designed to provide context data, format requirements, and instructions for theme assignment The prompt is similar to the prompt 647 (default and/or stable prompt) described in FIG. 6E.

In an embodiment, the prompt provide may include instruction such as "Analyze the following thought objects, identify common topics or themes, and create appropriate theme labels. Ensure the themes are descriptive, concise, and capture the main ideas present in the thought objects."

In an embodiment, a prompt may include instructions that can guide topic identification transformer 625 to perform tasks related to unsupervised object theming. Prompts help in structuring the input and providing clear instructions to topic identification transformer 625. They can be used to specify the desired format, style, tone, or content of the generated text. They can be used to specify the desired format, style, tone, or content of the generated text.

At step 1606, topic identification is performed by topic identification transformer 625 using topic identification mechanisms. In an embodiment, topic identification may be performed for each thought object individually or in a batch of thought objects.

A qualitative response is an open-ended, comment-style response, where a user has the freedom to textualize associated ideas into a user device and is not constrained by pre-determined answers.

At step 1610, themes are provided. Further, these labels (themes) are transmitted to theming transformer 620.

During operation, content in each cluster is analyzed and topics may be identified based on common words, phrases, or concepts. Topic identification transformer 625 might also provide a brief description or explanation for each created theme.

The topic identified may be ranked based on relevance (e.g. how well a theme represents the cluster content), distinctiveness (e.g. how unique a theme may be compared to other clusters), coverage (e.g. what percentage of the cluster is represented), and coherence (e.g. how well do elements within the theme relate to each other). Topics with higher rankings may be labeled as theme names. Visualization tools may be used to represent themes (e.g., word clouds, network graphs).

The Process in FIG. 16 ensures comprehensive theming of thought objects. It first attempts to match thought objects to known themes, and then uses a more exploratory approach for any remaining unthemed objects, ensuring all thought objects are categorized appropriately.

Figure 17:
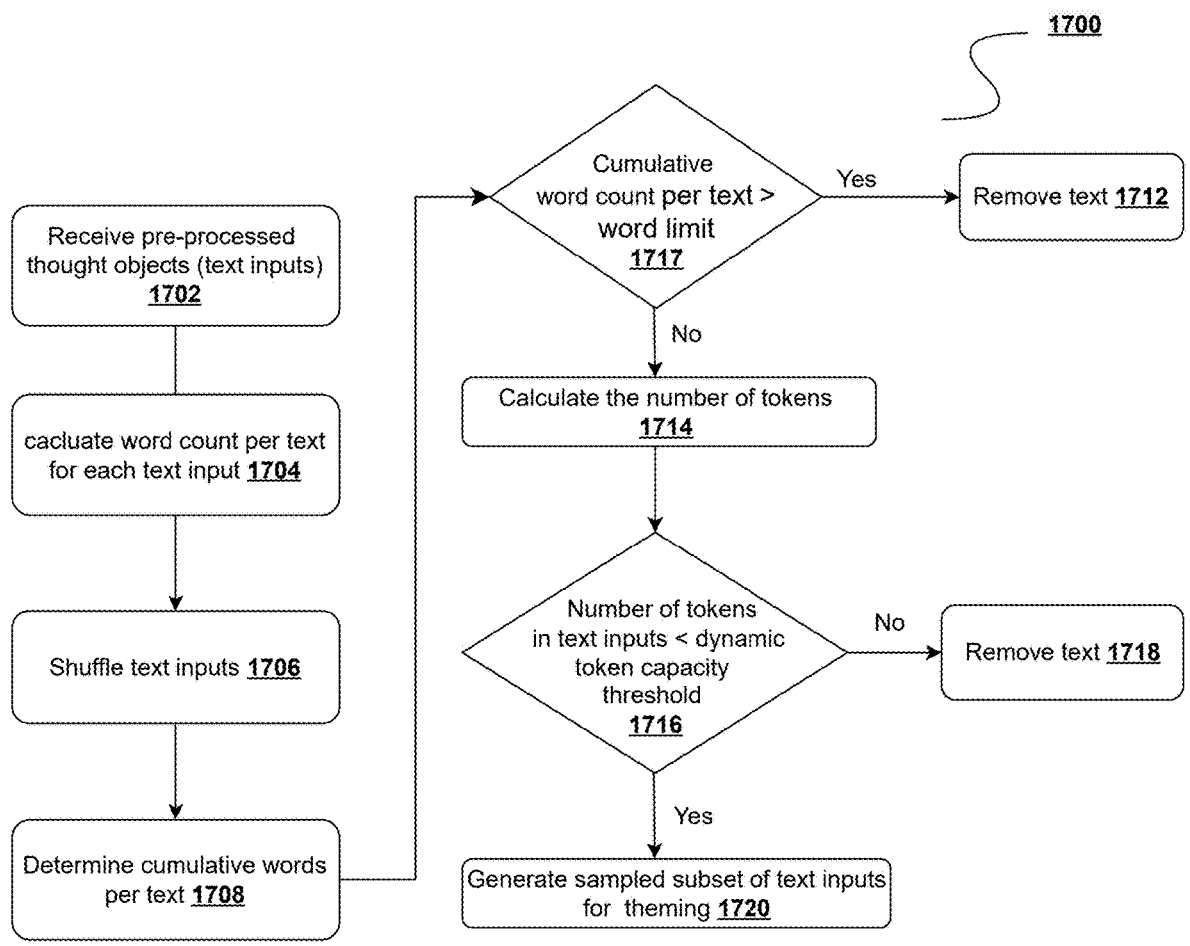
FIG. 17 is a flow diagram illustrating a method of sampling for the selection of text inputs in received thought objects, according to a preferred embodiment of the invention.

FIG. 17 is a flow diagram illustrating a method of Simple Random Sampling (SRS) for the selection of text inputs in received thought objects, according to a preferred embodiment of the invention.

At step 1702, theming computer 600A receives preprocessed thought objects (text inputs) that have already undergone normalization. These normalized text inputs have consistent formatting, standardized characters, and cleaned text. This ensures theming computer 600A works with clean, consistent text data.

At step 1704, theming computer 600A may calculate word count per text input using the normalized text. This involves tokenizing each text and counting the words. For example:

Text 1: "The product performance exceeded expectations" (5 words),
Text 2: "Setup process needs improvement" (4 words),
Text 3: "Customer support was responsive to my inquiries" (8 words).

At step 1706, theming computer 600A may perform a shuffle operation on text inputs to ensure truly random ordering with no bias. This is important for maintaining data representation quality when sampling. Using the example above, the shuffled order might become Text 3, Text 1, Text 2.

At step 1708, theming computer 600A may determine cumulative word count through the shuffled sequence of texts, maintaining a running total while preserving text boundaries. It may track both individual text lengths and running total across texts. Following our example, First text (Text 3): 8 words (cumulative=8)
Second text (Text 1): 5 words (cumulative=13)
Third text (Text 2): 4 words (cumulative=17)

At step 1710, theming computer 600A may check if the cumulative word count exceeds the pre-defined word limit. This is a preliminary check before token calculation. If Text 3 (8 words) was already at the limit, the process would move to step 1012.

At step 1712, when the cumulative word count exceeds the word limit, theming computer 600A removes the last added text to bring the total back under the word limit. In an embodiment, the pre-defined threshold for word limit is set by transformation computer 501 using the computed dynamic token capacity threshold.

Consider an example when the word limit is 15 words, Text 2 would be removed to bring the count back to 14 words. This type of removal process maintains complete thought objects (no partial text removal), preserves the random sampling nature, keeps cumulative word count under the limit, and retains earlier sampled texts for consistency.

At step 1714, when the cumulative word counts are within the pre-defined word limit, theming computer 600A calculates the actual number of tokens in the remaining text inputs. This involves a more detailed tokenization process that might count subwords or special characters. For example, "performance" might be tokenized as ["perform", "ance"], counting as 2 tokens.

At step 1716, theming computer 600A may compare the number of tokens in text inputs against the dynamic token capacity threshold. The dynamic token capacity threshold may be generated based on multiple parameters, including, but not limited to, the query complexity, number of thought objects, target summary length, quality requirements, priority levels, and any other specific user/system constraints.

At step 1718, when the number of tokens in text inputs exceeds the dynamic token capacity threshold, theming computer 600A may be configured to remove texts in the text inputs to meet the token limit. The texts to be removed may be selected based on the dynamic token capacity threshold value and/or score associated with the text. Further, complete thought objects rather than partial texts are removed to maintain coherence.

At step 1720 (once all thresholds are satisfied), when the number of tokens in text inputs is below the dynamic token capacity threshold, theming computer 600A generates a final subset of text inputs (simple sample), preserving both proportional representation and token limits. This subset maintains randomness while staying within both word and token limits, ready for further processing.

Figure 18:
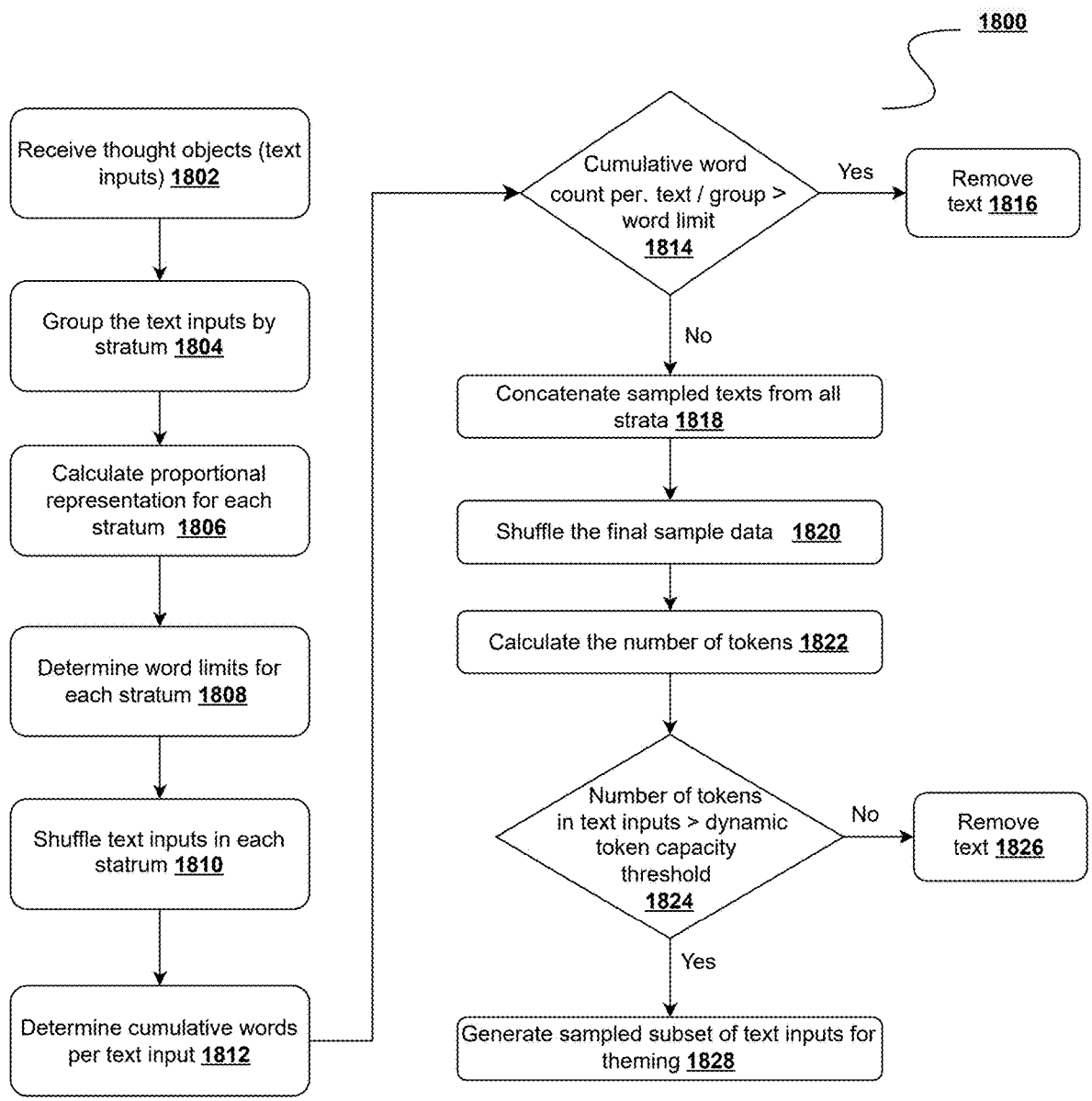
FIG. 18 is a flow diagram illustrating a method of stratified sampling for the selection of text inputs in received thought objects, according to a preferred embodiment of the invention.

FIG. 18 is a flow diagram illustrating a method of stratified sampling for the selection of text inputs in received thought objects, according to a preferred embodiment of the invention.

At step 1802, theming computer 600A may receive pre-processed thought objects (text inputs) that have already undergone normalization. These normalized text inputs have consistent formatting, standardized characters, and cleaned text. This ensures adaptive text sampler 586 works with clean, consistent text data.

At step 1804, theming computer 600A may group text inputs by strata (categories). For example, text inputs related to processing product feedback may be categorized into technical issues, user interface feedback, and feature requests.

At step 1806, the sampler calculates proportional representation for each stratum based on distribution. For example: the proportion of technical issues may be 40% (400 texts out of 1000), UI feedback may be 35% (350 texts out of 1000), and feature requests may be 25% (250 texts out of 1000).

At step 1808, theming computer 600A may determine word limits for each stratum based on their proportions. Continuing with the example discussed above, for a total word limit of 1000 words, technical issues may have 400 words (40%) as word limit, UI feedback may have 350 words (35%) as word limit, and feature requests may have 250 words (25%) as word limit.

At step 1810, theming computer 600A may shuffle the texts within each stratum separately to ensure random selection while maintaining stratification.

At step 1812, theming computer 600A may calculate the cumulative word counts per text input within each stratum group. This tracking cumulative word count per text input is done separately for each category.

At step 1814, theming computer 600A may check if the cumulative word count exceeds the pre-defined word limit for each stratum. In an embodiment, adaptive text sampler 586 may perform this check simultaneously for different strata.

At step 1816, when any stratum exceeds its allocated word limit, adaptive text sampler 586 may check and remove texts from that specific stratum until it's within limits.

At step 1818, theming computer 600A may concatenate the texts from all strata, maintaining the proportional representation.

At step 1820, theming computer 600A may shuffle the dataset to prevent any ordering bias while maintaining the stratified proportions.

At step 1822, theming computer 600A may calculate the total token count for the dataset.

At step 1824, when the number of tokens exceeds the dynamic token capacity threshold, then at step 1826, texts are removed from thought objects while maintaining proportional representation across strata.

At step 1824, when the number of tokens is within the dynamic token capacity threshold, then at step 1828, a final subset of text inputs (stratified sample) is generated, preserving both proportional representation and token limits.

The skilled person will be aware of a range of possible modifications of the various embodiments described above. Accordingly, the present invention is defined by the claims and their equivalents.

What is claimed is:

1. A system for theming a plurality of thought objects, the system comprising:
   a theming computer comprising one or more processors, a memory, a plurality of programming instructions stored in the memory that are executed by the one or more processors, the instructions cause the processor to:
   communicate with one or more transformers, wherein the one or more transformers are configured to:
     receive a plurality of thought objects and a prompt, wherein the plurality of thought objects comprises text inputs present in data from communication environments, and wherein the prompt comprises a request to determine themes for each thought object;
     for each thought object, determine, using a theming transformer of the one or more transformers, whether a probability score is above a pre-defined threshold, wherein the probability score is indicative of the thought object mapping to a known theme;
     responsive to the probability score of the thought object being above the pre-defined threshold, associate a known theme to the thought object, wherein the known theme is among previously themed thought objects;
     responsive to the probability score of the thought object being below the pre-defined threshold, generate, using a topic identification transformer of the transformers, a theme names of un-themed thought objects based on topics identified;
   wherein generating each theme name comprises:
     providing un-themed thought objects to the topic identification transformer, wherein the topic identification transformer is configured to:
       identify topics in the un-themed thought objects;
       determine a number of themes for the un-themed thought objects;
       label identified topics into a theme; and
       assign the theme to the thought object; and
     assign and display the themes associated with the plurality of thought objects on a graphical user interface of a user device.

2. The system of claim 1, wherein the plurality of programming instructions further cause the processor to:
   provide a list of themes to the theming transformer;
   generate a probability score between 0 and 1 indicating likelihood of each thought object mapping to each known theme; and
   return results in a structured format associating thought objects to the known theme with corresponding probability score.

3. The system of claim 1, wherein the received plurality of thought objects is generated by the theming computer using random sampling or stratified sampling.

4. The system of claim 1, wherein the prompt comprises context data, format requirements, and instructions for theme assignment.

5. The system of claim 1, wherein the prompt comprises a prompt assignment configured to cause the theming transformer to determine probability scores for mapping thought objects to known themes.

6. The system of claim 1, wherein the prompt comprises either:
   a default prompt configured for initial topic identification; or
   a stable prompt configured to maintain consistent themes across multiple analyses.

7. A computer-implemented method for assigning themes to a plurality of thought objects, the method comprising the steps of:
- receiving, at one or more transformers, a plurality of thought objects and a prompt, wherein the plurality of thought objects comprises text inputs present in data from communication environments, and wherein the prompt comprises a request to the one or more transformers to determine themes to the plurality of thought objects;
- for each thought object, determining, using a theming transformer of the one or more transformers, whether a probability score is above a pre-defined threshold, wherein the probability score is indicative of the thought object mapping to a known theme;
- responsive to the probability score of the thought object being above the pre-defined threshold, associating a known theme with the thought object, wherein the known theme is among previously themed thought objects;
- responsive to the probability score of the thought object being below the pre-defined threshold, generating, using a topic identification transformer of the one or more transformers, theme names of un-themed thought objects based on topics identified;
- wherein generating each theme name comprises:
  - providing un-themed thought objects to the topic identification transformer, wherein the topic identification transformer is configured to:
    - identifying topics in the un-themed thought objects;
    - determining a number of themes for the un-themed thought objects;
    - labeling identified topics into a theme; and
    - assigning the theme to the thought object; and
- assigning and displaying the themes associated with the plurality of thought objects on a graphical user interface of a user device.

8. The computer-implemented method of claim 7, wherein receiving the prompt at the theming transformer further comprises the steps of:
- receiving a list of themes at the one or more transformers;
- receiving instructions for generating a probability score between 0 and 1 indicating a likelihood of the thought object mapping to each known theme; and
- receiving instructions to return results in a structured format associating thought objects to the known theme with corresponding probability scores.

9. The computer-implemented method of claim 7, wherein the received plurality of thought objects is generated by the theming computer using simple random sampling or stratified sampling.

10. The computer-implemented method of claim 7, wherein the prompt comprises context data, format requirements, and instructions for theme assignment.

11. The computer-implemented method of claim 7, wherein the prompt comprises a prompt assignment configured to cause the theming transformer to determine probability scores for mapping thought objects to known themes.

12. The computer-implemented method of claim 7, wherein the prompt comprises either:
- a default prompt configured for initial topic identification; or
- a stable prompt configured to maintain consistent themes across multiple analyses.

* * * * *